(12) United States Patent
Zhu

(10) Patent No.: US 11,950,009 B2
(45) Date of Patent: Apr. 2, 2024

(54) SOLID-STATE IMAGE SENSOR

(71) Applicant: Sony Semiconductor Solutions Corporation, Kanagawa (JP)

(72) Inventor: Hongbo Zhu, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 499 days.

(21) Appl. No.: 17/287,815

(22) PCT Filed: Sep. 27, 2019

(86) PCT No.: PCT/JP2019/038136
§ 371 (c)(1),
(2) Date: Apr. 22, 2021

(87) PCT Pub. No.: WO2020/090311
PCT Pub. Date: May 7, 2020

(65) Prior Publication Data
US 2021/0385402 A1 Dec. 9, 2021

(30) Foreign Application Priority Data

Oct. 30, 2018 (JP) .................................. 2018-203395
Sep. 17, 2019 (JP) .................................. 2019-168602

(51) Int. Cl.
*H04N 25/77* (2023.01)
*H04N 25/47* (2023.01)
(Continued)

(52) U.S. Cl.
CPC ............. *H04N 25/77* (2023.01); *H04N 25/47* (2023.01); *H04N 25/767* (2023.01); *H04N 25/79* (2023.01)

(58) Field of Classification Search
CPC .... H04N 25/47; H04N 25/571; H04N 25/573; H04N 25/77; H04N 25/772; H04N 25/773; H04N 25/79
See application file for complete search history.

(56) References Cited

U.S. PATENT DOCUMENTS

2015/0265227 A1 9/2015 Sano et al.
2018/0058926 A1* 3/2018 Suh ..................... H03F 3/45071
(Continued)

FOREIGN PATENT DOCUMENTS

JP           05-80156 A      4/1993
JP           2015-181563 A   10/2015
JP           2016-533140 A   10/2016

OTHER PUBLICATIONS

International Search Report (PCT/ISA/210), International Application No. PCT/JP2019/038136, dated Nov. 26, 2019.
(Continued)

*Primary Examiner* — Daniel M Pasiewicz
(74) *Attorney, Agent, or Firm* — Michael Best & Friedrich LLP

(57) ABSTRACT

In a solid-state image sensor that compares an amount of change in light amount and a threshold, time required to adjust the threshold is shortened.
The solid-state image sensor includes a voltage comparison unit and a count unit. In the solid-state image sensor, the voltage comparison unit compares an analog signal according to an amount of change in incident light with a predetermined voltage indicating a boundary of a predetermined voltage range, and outputs a comparison result as a voltage comparison result. Furthermore, in the solid-state image sensor, the count unit counts a count value every time the voltage comparison result indicating that the analog signal falls outside the voltage range is output.

20 Claims, 29 Drawing Sheets

(51) Int. Cl.
*H04N 25/767* (2023.01)
*H04N 25/79* (2023.01)

(56) References Cited

U.S. PATENT DOCUMENTS

| | | | |
|---|---|---|---|
| 2020/0260039 A1* | 8/2020 | Niwa | H04N 25/77 |
| 2020/0358977 A1* | 11/2020 | Niwa | H04N 25/79 |
| 2021/0152762 A1* | 5/2021 | Sakakibara | H04N 25/60 |

OTHER PUBLICATIONS

Notification of Transmittal of the International Search Report and the Written Opinion of the International Searching Authority, or the Declaration (PCT/ISA/220), International Application No. PCT/JP2019/038136, dated Dec. 10, 2019.
Written Opinion of the International Search Authority (PCT/ISA/237), International Application No. PCT/JP2019/038136, dated Dec. 10, 2019.

* cited by examiner a b a b a b c

SOLID-STATE IMAGE SENSOR

TECHNICAL FIELD

The present technology relates to a solid-state image sensor. Specifically, the present technology relates to a solid-state image sensor that detects that an amount of change in a light amount has exceeded a threshold.

BACKGROUND ART

Conventionally, a synchronous solid-state image sensor for capturing image data (frame) in synchronization with a synchronous signal such as a vertical synchronous signal has been used in an imaging device or the like. The typical synchronous solid-state image sensor can acquire the image data only at each cycle (for example, 1/60 seconds) of the synchronous signal, and is thus difficult to deal with a case where higher-speed processing is required in the fields of transportation, robots, and the like. Therefore, an asynchronous solid-state image sensor provided with a detection circuit that detects that, for each pixel address, an amount of change in a light amount of the pixel has exceeded a threshold as an address event in real time has been proposed (for example, see Patent Document 1). Such a solid-state image sensor for detecting an address event for each pixel is called dynamic vision sensor (DVS). The detection circuit in the DVS detects the presence or absence of the address event by comparing a voltage signal according to the amount of change in incident light with a threshold voltage indicating the threshold.

CITATION LIST

Patent Document

Patent Document 1: PCT Japanese Translation Patent Publication No. 2016-533140

SUMMARY OF THE INVENTION

Problems to be Solved by the Invention

The above-described asynchronous solid-state image sensor (that is, DVS) generates and outputs data at a much higher speed than the synchronous solid-state image sensor. Therefore, for example, in the transportation field, processing of recognizing a person or an obstacle as an image is executed at a high speed. However, there is a problem that a certain time is required to complete adjustment in adjusting the threshold for the purpose of improving detection accuracy. This is because the time is required to stabilize a changed voltage when the threshold voltage indicating the threshold is changed.

The present technology has been made in view of such a situation, and an object is to shorten a time required to adjust a threshold in a solid-state image sensor that compares an amount of change in a light amount with the threshold.

Solutions to Problems

The present technology has been made to solve the above-described problem, and the first aspect thereof is a solid-state image sensor including a voltage comparison unit configured to compare an analog signal according to an amount of change in incident light with a predetermined voltage indicating a boundary of a predetermined voltage range, and output a comparison result as a voltage comparison result, and a count unit configured to count a count value every time the voltage comparison result indicating that the analog signal falls outside the voltage range is output, and a method of controlling the solid-state image sensor. This brings about an effect that the count value according to the amount of change in incident light is counted.

Furthermore, in the first aspect, a control circuit configured to supply a predetermined control signal may be further included, and the count unit may select any of a plurality of bits indicating the count value and output the selected bit according to the control signal. This brings about an effect that the bit corresponding to a threshold is output as a detection signal.

Furthermore, in the first aspect, the predetermined voltage may include an upper limit voltage indicating an upper limit of the voltage range and a lower limit voltage indicating a lower limit of the voltage range, and the count unit may include an upper limit-side counter that counts a count value every time the voltage comparison result indicating that the analog signal is higher than the upper limit voltage is output, and a lower limit-side counter that counts a count value every time the voltage comparison result indicating that the analog signal is lower than the lower limit voltage is output. This brings about an effect that the count value according to an increase amount of the incident light and the count value according to a decrease amount of the incident light are counted.

Furthermore, in the first aspect, the predetermined voltage may be a variable voltage that varies to either the upper limit voltage or the lower limit voltage different from each other, and the count unit further may include an upper limit-side switch that opens or closes a path between the voltage comparison unit and the upper limit counter according to a polarity signal indicating a value of the variable voltage, and a lower limit-side switch that opens or closes a path between the voltage comparison unit and the lower limit counter according to the polarity signal. This brings about an effect that the variable voltage and the analog signal are compared.

Furthermore, in the first aspect, a reference signal comparison unit configured to compare a pixel signal according to a light amount of the incident light with a predetermined reference signal, and output a comparison result as a reference signal comparison result may be further included, and the count unit may include a selection unit that select either the voltage comparison result or the reference signal comparison result, and a counter that counts the count value on the basis of the selected comparison result. This brings about the effect that image data is captured.

Furthermore, in the first aspect, the predetermined voltage may include an upper limit voltage indicating an upper limit of the voltage range and a lower limit voltage indicating a lower limit of the voltage range, the voltage comparison result may include an upper limit-side comparison result indicating a comparison result between the analog signal and the upper limit voltage, and a lower limit-side comparison result indicating a comparison result between the analog signal and the lower limit voltage, the counter may include a front-stage counter and a rear-stage counter, and the selection unit may include a front-stage selector that selects either one of the upper limit-side comparison result and the lower limit-side comparison result, or the reference signal comparison result, and supplies the selected comparison result to the front-stage counter, and a rear-stage selector that selects the other of the upper limit-side comparison result and the lower limit-side comparison result, or an output bit of the front-stage counter, and supplies the selected result to the rear-stage counter. This brings about an effect that a count value having a size obtained by summing the bit depths of the front-stage counter and the rear-stage counter is counted.

Furthermore, in the first aspect, the counter may further include a spare counter. This brings about an effect that a count value having a size obtained by summing the bit depths of front-stage counter, the rear-stage counter, and the spare counter is enlarged.

Furthermore, in the first aspect, the spare counter may count a count value on the basis of an output bit of the rear-stage counter, and a switch that opens or closes a path between the rear-stage selector and the spare counter may be further included. This brings about an effect that a count value having a size obtained by summing the bit depths of front-stage counter, the rear-stage counter, and the spare counter is enlarged.

Furthermore, in the first aspect, the spare counter may be inserted between the front-stage selector and the reference signal comparison unit. This brings about an effect that a count value having a size obtained by summing the bit depths of front-stage counter, the rear-stage counter, and the spare counter is enlarged.

Furthermore, in the first aspect, a control circuit configured to supply a predetermined threshold may be further included, and the count unit may include a counter that counts the count value every time the voltage comparison result indicating that the analog signal falls outside the voltage range is output, and a threshold comparison unit that compares the count value with the threshold. This brings about an effect that an address event is detected by comparison between the count value with the threshold.

Furthermore, in the first aspect, the predetermined voltage may include an upper limit voltage indicating an upper limit of the voltage range and a lower limit voltage indicating a lower limit of the voltage range, and the counter may perform one of increment processing and decrement processing for the count value in a case where the voltage comparison result indicating that the analog signal is higher than the upper limit voltage is output, and perform the other of the increment processing and the decrement processing in a case where the voltage comparison result indicating that the analog signal is lower than the lower limit voltage is output. This brings about an effect that an increment value and a decrement value are offset each other.

Furthermore, in the first aspect, the predetermined voltage may be a variable voltage that varies to either the upper limit voltage or the lower limit voltage different from each other, and the counter may perform one of the increment processing and the decrement processing on the basis of a polarity signal indicating a value of the variable voltage and the voltage comparison result. This brings about an effect that the variable voltage and the analog signal are compared.

Furthermore, in the first aspect, the voltage comparison unit may be arranged in each of a plurality of pixels, the count unit may be arranged in a pixel block in which the plurality of pixels is arrayed, and the count unit may include a comparison result processing unit that processes the voltage comparison results respectively corresponding to the plurality of pixels, and a counter that counts the count value on the basis of a processing result of the comparison result processing unit. This brings about an effect that the count unit is shared by a plurality of pixels.

Furthermore, in the first aspect, the predetermined voltage may be a variable voltage that varies to either the upper limit voltage or the lower limit voltage different from each other, the comparison result processing unit may include an upper limit-side comparison result processing unit that processes the voltage comparison result corresponding to the upper limit voltage, and a lower limit-side comparison result processing unit that processes the voltage comparison result corresponding to the lower limit voltage, and the count unit may further include an upper limit-side switch that opens or closes a path between the voltage comparison unit and the upper limit-side comparison result processing unit according to a polarity signal indicating a value of the variable voltage, and a lower limit-side switch that opens or closes a path between the voltage comparison unit and the lower limit-side comparison result processing unit according to the polarity signal. This brings about an effect that the variable voltage and the analog signal are compared.

Furthermore, in the first aspect, the comparison result processing unit may output an exclusive logical sum of the voltage comparison results respectively corresponding to the plurality of pixels as the processing result. This brings about an effect that the count value is counted on the basis of the exclusive logical sum.

Furthermore, in the first aspect, the comparison result processing unit may output a logical sum of the voltage comparison results respectively corresponding to the plurality of pixels as the processing result. This brings about an effect that the count value is counted on the basis of the logical sum.

Furthermore, in the first aspect, the comparison result processing unit may select any of the voltage comparison results respectively corresponding to the plurality of pixels and output the selected voltage comparison result as the processing result. This brings about an effect that the count value is counted on the basis of the selected comparison result.

Furthermore, in the first aspect, the voltage comparison unit may include a current-voltage conversion unit that converts a photocurrent into a voltage signal, a differentiator circuit that differentiates the voltage signal and outputs the differentiated voltage signal as the analog signal, and a comparator that compares the analog signal with the predetermined voltage. This brings about an effect that a comparison result between a differential signal of the voltage signal and the predetermined voltage is output.

Furthermore, in the first aspect, an initialization control unit configured to control the differentiator circuit to set the analog signal to a predetermined initial value every time the count value is counted may be further included. This brings about an effect that the analog signal is initialized every count.

Furthermore, in the first aspect, a transfer unit configured to transfer a signal indicating a result of comparison between the count value and a predetermined threshold, and initialize the count value after transferring the signal may be further included. This brings about an effect that the count value is initialized at the time of transfer.

MODE FOR CARRYING OUT THE INVENTION

Hereinafter, modes for implementing the present technology (hereinafter referred to as embodiments) will be described. Description will be given according to the following order.

Figure 1:
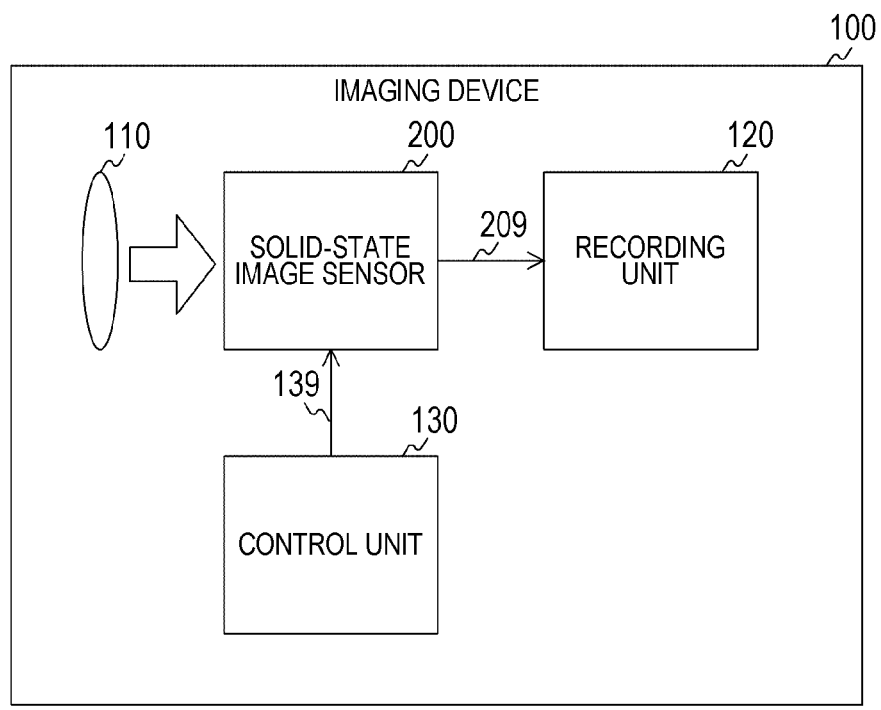
FIG. 1 is a block diagram illustrating a configuration example of an imaging device according to a first embodiment of the present technology.

1. First Embodiment (an example of performing counting on the basis of a comparison result)
2. Second Embodiment (an example of incrementing or decrementing a count value on the basis of a comparison result)
3. Third Embodiment (an example of performing counting on the basis of a comparison result with a reference signal or a comparison result with a voltage)
4. Fourth Embodiment (scan method)
5. Applications to Moving Bodies 1. First Embodiment Configuration Example of Imaging Device FIG. 1 is a block diagram illustrating a configuration example of an imaging device 100 according to a first embodiment of the present technology. The imaging device 100 includes an imaging lens 110, a solid-state image sensor 200, a recording unit 120, and a control unit 130. As the imaging device 100, a camera mounted on an industrial robot, a vehicle-mounted camera, or the like is assumed.

The imaging lens 110 condenses incident light and guides the incident light to the solid-state image sensor 200. The solid-state image sensor 200 photoelectrically converts the incident light to detect the presence or absence of an address event, and generates a detection result of the detection. Here, the address event includes an on-event and an off-event, and the detection result includes a one-bit on-event detection result and a one-bit off-event detection result. The on-event means that an amount of change in an incident light amount has exceeded a predetermined upper limit threshold. Meanwhile, the off-event means that the amount of change in the light amount has fallen below a predetermined lower limit threshold. The solid-state image sensor 200 processes the detection result of the address event and outputs data indicating a processing result to the recording unit 120 via a signal line 209. Note that the solid-state image sensor 200 may detect only one of the on-event and the off-event.

The recording unit 120 records the data from the solid-state image sensor 200. The control unit 130 controls the solid-state image sensor 200 to detect the presence or absence of an address event.

Configuration Example of Solid-State Image Sensor

Figure 2:
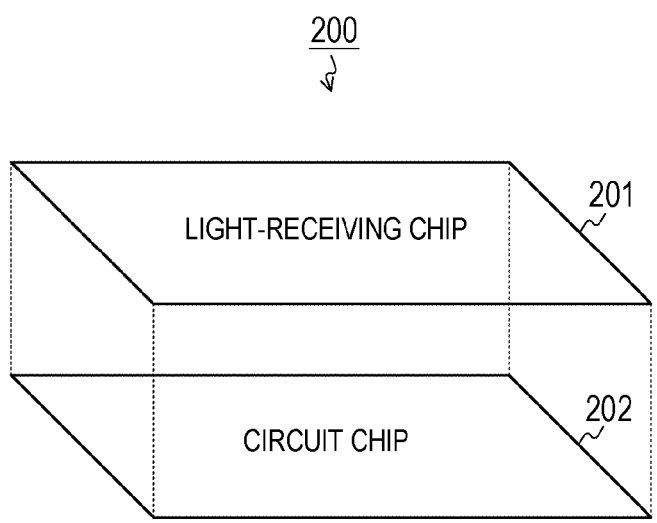
FIG. 2 is a diagram illustrating an example of a stacked structure of a solid-state image sensor according to the first embodiment of the present technology.

FIG. 2 is a diagram illustrating an example of a stacked structure of the solid-state image sensor 200 according to the first embodiment of the present technology. The solid-state image sensor 200 includes a circuit chip 202 and a light-receiving chip 201 stacked on the circuit chip 202. These chips are electrically connected via a connection part such as a via. Note that Cu—Cu bonding or bump can be used for connection in addition to the via.

Figure 3:
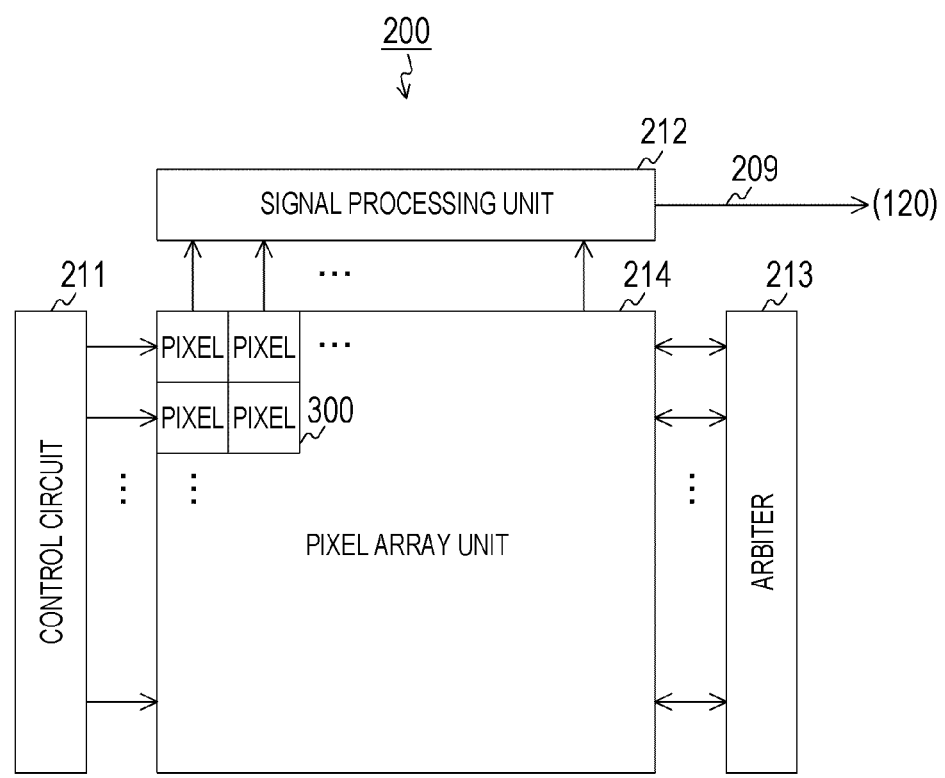
FIG. 3 is a block diagram illustrating a configuration example of the solid-state image sensor according to the first embodiment of the present technology.

FIG. 3 is a block diagram illustrating a configuration example of the solid-state image sensor 200 according to the first embodiment of the present technology. The solid-state image sensor 200 includes a control circuit 211, a signal processing unit 212, an arbiter 213, and a pixel array unit 214. In the pixel array unit 214, a plurality of pixels 300 is arrayed in a two-dimensional lattice manner.

The control circuit 211 controls an upper limit threshold and a lower limit threshold for detecting an address event.

The pixel 300 is for detecting the presence or absence of an address event. When detecting an address event, the pixel 300 supplies a request for requesting transfer of a detection signal indicating the detection result to the arbiter 213. Then, when receiving a response to the request, the pixel 300 supplies the detection signal to the signal processing unit 212.

The arbiter 213 arbitrates requests from respective pixel blocks, and transmits a response to the pixel 300 on the basis of an arbitration result.

The signal processing unit 212 executes predetermined signal processing such as image recognition processing for the detection signal from the pixel array unit 214. The signal processing unit 212 supplies data indicating a processing result to the recording unit 120 via the signal line 209.

Configuration Example of Pixel

Figure 4:
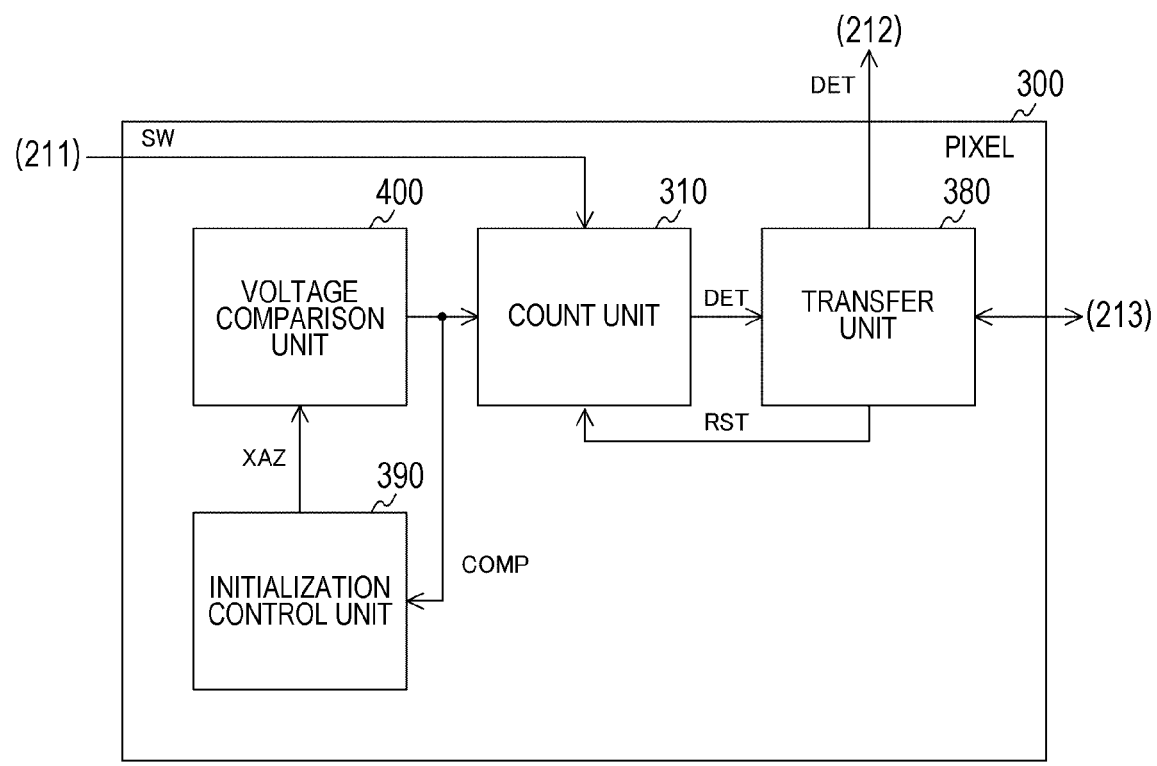
FIG. 4 is a block diagram illustrating a configuration example of a pixel according to the first embodiment of the present technology.

FIG. 4 is a block diagram illustrating a configuration example of the pixel 300 according to the first embodiment of the present technology. The pixel 300 includes a voltage comparison unit 400, a count unit 310, a transfer unit 380, and an initialization control unit 390.

The voltage comparison unit 400 compares an analog differential signal according to the amount of change in incident light with a predetermined voltage comparison unit 400 (upper limit voltage or lower limit voltage) indicating a boundary of a predetermined voltage range, and outputs a comparison result COMP to the count unit 310. Note that the differential signal is an example of an analog signal described in the claims.

The count unit 310 counts a count value every time the comparison result COMP indicating that the differential signal falls outside the voltage range is output. The count unit 310 generates a detection signal DET indicating the detection result of the address event from the count value and supplies the detection signal DET to the transfer unit 380.

The transfer unit 380 transfers the detection signal DET, and supplies a reset signal RST to the count unit 310 after the transfer to control the count value to an initial value. The transfer unit 380 supplies a request for requesting transfer of the detection signal DET to the arbiter 213 when the address event is detected. Then, when receiving a response to the request, the transfer unit 380 supplies the detection signal to the signal processing unit 212 and supplies the reset signal RST to the count unit 310.

The initialization control unit 390 supplies an auto-zero signal XAZ to the voltage comparison unit 400 every time the count value is counted by the comparison result COMP to control the differential signal to the initial value.

Configuration Example of Voltage Comparison Unit

Figure 5:
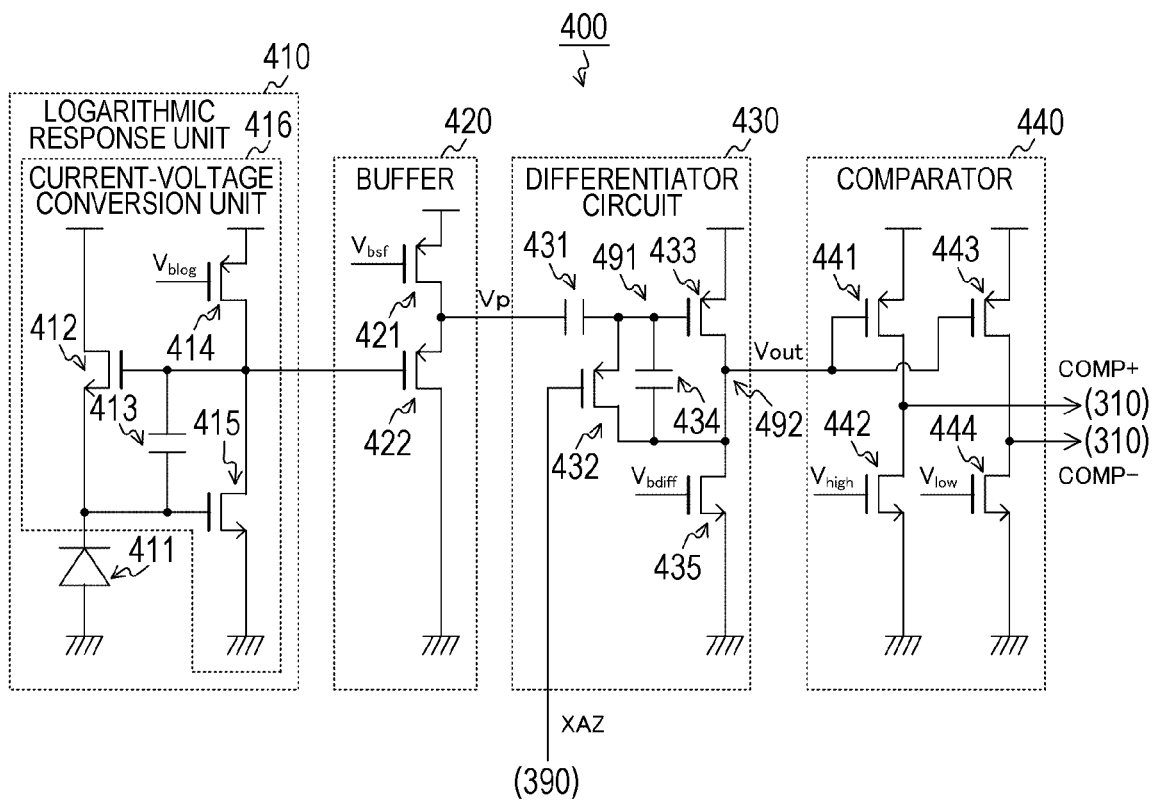
FIG. 5 is a circuit diagram illustrating a configuration example of a voltage comparison unit according to the first embodiment of the present technology.

FIG. 5 is a circuit diagram illustrating a configuration example of the voltage comparison unit 400 according to the first embodiment of the present technology. The voltage comparison unit 400 includes a logarithmic response unit 410, a buffer 420, a differentiator circuit 430, and a comparator 440.

The logarithmic response unit 410 generates a photocurrent by photoelectric conversion and logarithmically converts the photocurrent into a voltage. The logarithmic response unit 410 includes a photoelectric conversion element 411 and a current-voltage conversion unit 416.

The photoelectric conversion element 411 generates a photocurrent by photoelectric conversion for incident light. The current-voltage conversion unit 416 logarithmically converts the photocurrent into a pixel voltage Vp. The current-voltage conversion unit 416 includes N-type transistors 412 and 415, a capacitor 413, and a P-type transistor 414. Metal-oxide-semiconductor (MOS) transistors are used as the N-type transistor 412, the P-type transistor 414, and the N-type transistor 415, for example.

A source of the N-type transistor 412 is connected to a cathode of the photoelectric conversion element 411, and a drain of the N-type transistor 412 is connected to a power supply terminal. The P-type transistor 414 and the N-type transistor 415 are connected in series between the power supply terminal and a reference terminal having a predetermined reference potential (ground potential or the like). Furthermore, a connection point between the P-type transistor 414 and the N-type transistor 415 is connected to a gate of the N-type transistor 412 and an input terminal of the buffer 420. A connection point between the N-type transistor 412 and the photoelectric conversion element 411 is connected to a gate of the N-type transistor 415.

Furthermore, a predetermined bias voltage $V_{blog}$ is applied to a gate of the P-type transistor 414. The capacitor 413 is inserted between the gate of the N-type transistor 412 and the gate of the N-type transistor 415.

Furthermore, for example, the photoelectric conversion element 411 is arranged on the light-receiving chip 201, and a rear-stage circuit is arranged on the circuit chip 202. Note that the circuits and elements arranged on the light-receiving chip 201 and the circuit chip 202 are not limited to this configuration. For example, the photoelectric conversion element 411, the N-type transistors 412 and 415, and the capacitor 413 can be arranged on the light-receiving chip 201, and the rear-stage circuit can be arranged on the circuit chip 202.

The buffer 420 outputs an input pixel voltage to the differentiator circuit 430. The buffer 420 can improve a drive force for driving a rear stage. Furthermore, the buffer 420 can secure isolation of noise associated with a rear-stage switching operation.

Furthermore, the buffer 420 includes the P-type transistors 421 and 422. For example, MOS transistors are used as these transistors.

In the buffer 420, the P-type transistors 421 and 422 are connected in series between the power supply terminal and the reference potential terminal. Furthermore, a gate of the P-type transistor 422 is connected to the logarithmic response unit 410, and a connection point of the P-type transistors 421 and 422 is connected to the differentiator circuit 430. A predetermined bias voltage $V_{bsf}$ is applied to a gate of the P-type transistor 421.

The differentiator circuit 430 obtains the amount of change in the pixel voltage Vp by differential operation. The amount of change in the pixel voltage Vp indicates the amount of change in the light amount. The differentiator circuit 430 supplies a differential signal Vout indicating the amount of change in the light amount to the comparator 440.

Furthermore, the differentiator circuit 430 includes capacitors 431 and 434, P-type transistors 432 and 433, and an N-type transistor 435. For example, MOS transistors are used as transistors in the differentiator circuit 430, for example.

The P-type transistor 433 and the N-type transistor 435 are connected in series between the power supply terminal and the reference potential terminal. A predetermined bias voltage $V_{bdiff}$ is input to a gate of the N-type transistor 435. These transistors function as an inverting circuit having the gate of the P-type transistor 433 as an input terminal 491 and the connection point of the P-type transistor 433 and the N-type transistor 435 as an output terminal 492.

The capacitor 431 is inserted between the buffer 420 and the input terminal 491. The capacitor 431 supplies to a current according to time derivative of (in other words, the amount of change in) the pixel voltage Vp from the buffer 420 to the input terminal 491. Furthermore, the capacitor 434 is inserted between the input terminal 491 and the output terminal 492.

The P-type transistor 432 opens and closes a path between the input terminal 491 and the output terminal 492 according to the auto-zero signal XAZ from the initialization control unit 390. The initialization control unit 390 sets the auto-zero signal XAZ from high level to low level to instruct initialization every time the count value is counted, for example. Then, the P-type transistor 432 transitions to an ON state according to the auto-zero signal XAZ, and sets the differential signal Vout to an initial value.

The comparator 440 compares the differential signal Vout with a predetermined voltage (upper limit voltage or lower limit voltage) indicating the boundary of a constant voltage range. The comparator 440 includes P-type transistors 441 and 443 and N-type transistors 442 and 444. For example, MOS transistors are used as these transistors.

In the comparator 440, the P-type transistor 441 and the N-type transistor 442 are connected in series between the power supply terminal and the reference terminal, and the P-type transistor 443 and the N-type transistor 444 are also connected in series between the power supply terminal and the reference terminal. Furthermore, gates of the P-type transistors 441 and 443 are connected to the differentiator circuit 430. An upper limit voltage $V_{high}$ is applied to a gate of the N-type transistor 442, and a lower limit voltage $V_{low}$ is applied to a gate of the N-type transistor 444.

A connection point of the P-type transistor 441 and the N-type transistor 442 is connected to the count unit 310, and a voltage at this connection point is output as a comparison result COMP+ with respect to the upper limit voltage. A connection point of the P-type transistor 443 and the N-type transistor 444 is also connected to the count unit 310, and a voltage at this connection point is output as a comparison result COMP− with respect to the lower limit voltage. With such a connection, the comparator 440 outputs the high-level comparison result COMP+ in a case where the differential signal Vout is higher than the upper limit voltage $V_{high}$, and outputs the low-level comparison result COMP− in a case where the differential signal Vout is lower than the lower limit voltage $V_{low}$. The comparison result COMP is a signal including these comparison results COMP+ and COMP−.

Note that the comparator 440 compares both the upper limit voltage and the lower limit voltage with the differential signal Vout. However, the comparator 440 may compare only one of the upper limit voltage and the lower limit voltage with the differential signal Vout. In this case, unnecessary transistors can be eliminated. For example, when comparing the differential signal Vout only with the upper limit voltage, only the P-type transistor 441 and the N-type transistor 442 are arranged.

Figure 6:
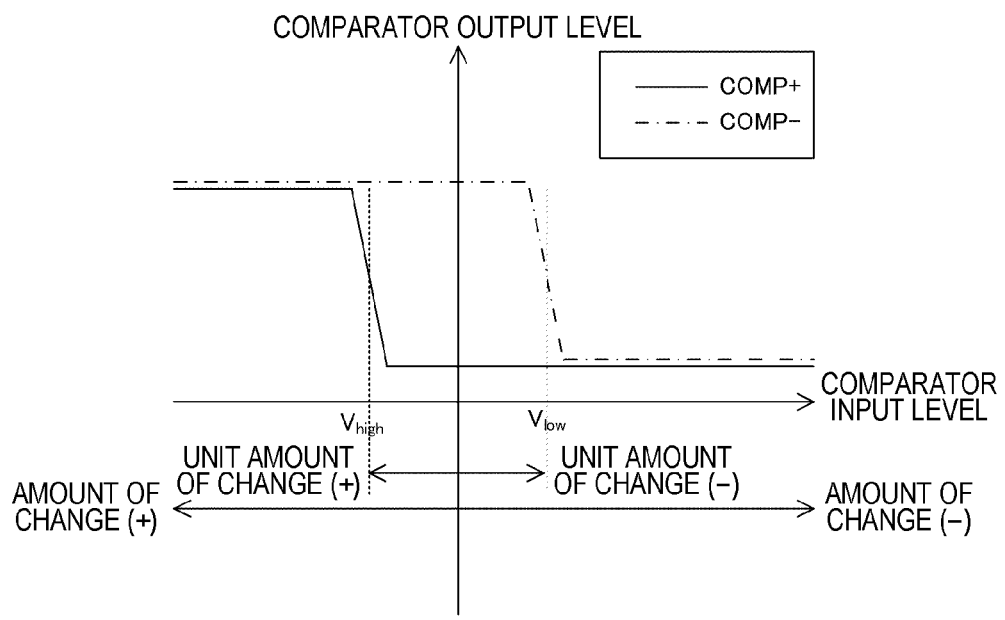
FIG. 6 is a graph illustrating an example of an input/output characteristic of a comparator according to the first embodiment of the present technology.

FIG. 6 is a graph illustrating an example of an input/output characteristic of the comparator 440 according to the first embodiment of the present technology. In FIG. 6, the vertical axis represents the level of the output signal (comparison result COMP+ or COMP−) of the comparator 440, and the horizontal axis represents the level of the input signal (differential signal) of the comparator 440. Furthermore, the solid line represents a locus of the comparison result COMP+, and the alternate long and short dash line represents a locus of the comparison result COMP−.

The light amount when the differential signal is at "0" level is set as a reference amount, and when a positive light amount difference (variation amount) with respect to the reference amount exceeds a value corresponding to the upper limit voltage $V_{high}$, the comparison result COMP+ changes from the low level to the high level. The amount of change corresponding to the upper limit voltage $V_{high}$ is hereinafter referred to as "unit amount of change (+)". Meanwhile, a negative light amount difference with respect to the reference amount falls below a value corresponding to the lower limit voltage $V_{low}$, the comparison result COMP− changes from the high level to the low level. The amount of change corresponding to the lower limit voltage $V_{low}$ is hereinafter referred to as "unit amount of change (−)".

Configuration Example of Count Unit

Figure 7:
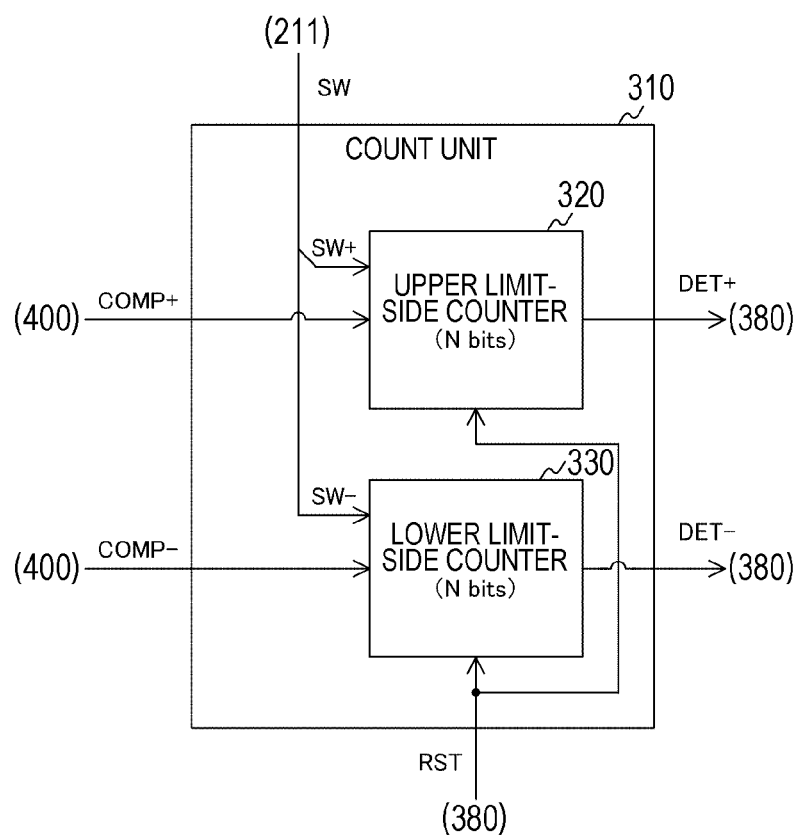
FIG. 7 is a block diagram illustrating a configuration example of a count unit according to the first embodiment of the present technology.

FIG. 7 is a block diagram illustrating a configuration example of the count unit 310 according to the first embodiment of the present technology. The count unit 310 includes an upper limit-side counter 320 and a lower limit-side counter 330. For example, binary counters are used as the upper limit-side counter 320 and the lower limit-side counter 330. Furthermore, a control signal SW from the control circuit 211 includes an upper limit-side N-bit (N is an integer) control signal SW+ and a lower limit-side N-bit (N is an integer) control signal SW−. Between these control signals, the control signal SW+ is input to the upper limit-side counter 320, and the control signal SW− is input to the lower limit-side counter 330.

Note that counters (such as Johnson counters or gray code counters) other than the binary counters can be used as the upper limit-side counter 320 and the lower limit-side counter 330. Furthermore, the upper limit-side counter 320 and the lower limit-side counter 330 can be implemented using a linear feedback shift register (LFSR), a latch, an adder, and the like.

The upper limit-side counter 320 counts (for example, increments by 1) the count value every time the comparison result COMP+ of the value (for example, the high level) when the differential signal Vout is higher than the upper limit voltage $V_{high}$ is output. Furthermore, the upper limit-side counter 320 selects an n-th (n is an integer of 0 to N−1) digit bit from among N bits indicating the count value according to the control signal SW+ and outputs the n-th digit bit to the transfer unit 380 as the detection signal DET+.

Here, as described above, a high-level comparison result COMP+ is output and the count value is counted every time the amount of change in the light amount exceeds the unit amount of change (+). The n-th digit bit of the N bits indicating the count value becomes at the high level when the count value becomes $2^n$ in the case of the binary counter. Therefore, the n-th digit bit indicates whether or not the amount of change in the light amount exceeds the unit amount of change $(+) \times 2^n$. In the case of setting the unit amount of change $(+) \times 2^n$ as the upper limit threshold, the n-th digit bit (detection signal DET+) indicates whether or not the amount of change in the light amount exceeds the upper limit threshold (in other words, the presence or absence of an on-event).

The lower limit-side counter 330 counts (for example, increments by 1) the count value every time the comparison result COMP− of the value (for example, the low level) when the differential signal Vout is lower than the lower limit voltage $V_{low}$ is output. Furthermore, the lower limit-side counter 330 selects the n-th digit bit from among the N bits indicating the count value according to the control signal SW− and outputs the n-th digit bit to the transfer unit 380 as the detection signal DET−.

In the lower limit-side counter 330, the n-th digit bit (detection signal DET−) indicates whether or not the amount of change in the light amount falls below the lower limit threshold (in other words, the presence or absence of an off-event).

Furthermore, the count values of the upper limit-side counter 320 and the lower limit-side counter 330 are initialized to the initial value (for example, "0") by the reset signal RST from the transfer unit 380.

Note that the configuration of arranging both the upper limit-side counter 320 and the lower limit-side counter 330 is adopted. However, only one of the upper limit-side counter 320 and the lower limit-side counter 330 may be arranged. For example, the lower limit-side counter 330 is not required in detecting only an on-event.

Furthermore, both the upper limit-side counter 320 and the lower limit-side counter 330 output the n-th digit bits as the detection signals. However, the upper limit-side counter 320 and the lower limit-side counter 330 can output different digit bits from each other. For example, the upper limit-side counter 320 outputs the third digit bit as the detection signal DET+ whereas the lower limit-side counter 330 can output the second digit bit as the detection signal DET+.

Furthermore, the upper limit-side counter 320 and the lower limit-side counter 330 increments the count values by 1 (that is, increment by 1). However, the increment value may be 2 or larger. Furthermore, these counters can decrement the count value.

Configuration Example of Counter

Figure 8:
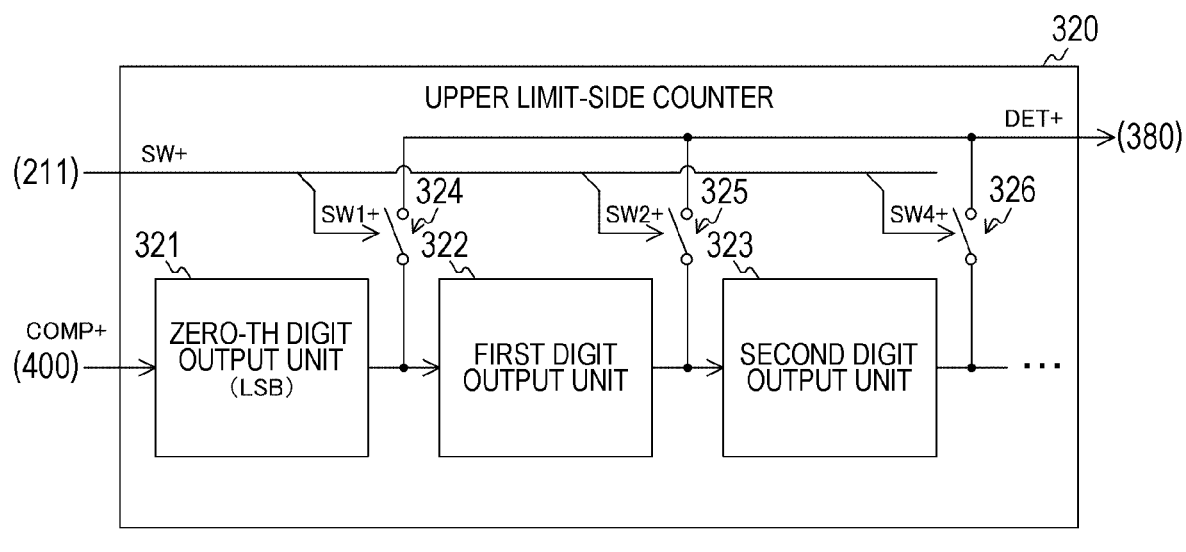
FIG. 8 is block diagrams illustrating a configuration example of an upper limit-side counter and a lower limit-side counter according to the first embodiment of the present technology.
Figure 8:
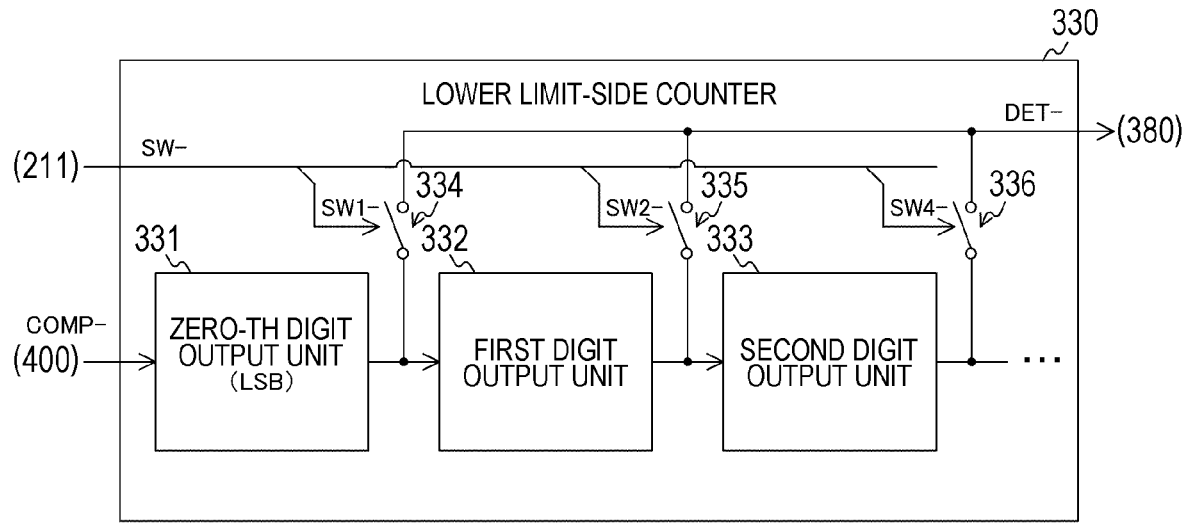

FIG. 8 is block diagrams illustrating a configuration example of the upper limit-side counter 320 and the lower limit-side counter 330 according to the first embodiment of the present technology. a in FIG. 8 is a block diagram illustrating a configuration example of the upper limit-side counter 320 and b in FIG. 8 is a block diagram illustrating a configuration example of the lower limit-side counter 330.

The upper limit-side counter 320 includes N n-th digit output units such as a zero-th digit output unit 321, a first digit output unit 322, and a second digit output unit 323, and N switches such as switches 324, 325, and 326. Furthermore, the control signal SW+ from the control circuit 211 includes N control signals $SW2^n+$ such as control signals SW1+, SW2+, and SW4+. These control signals are signals for giving an instruction on an output of any one of N digits. For example, only the control signal corresponding to the digit to be output among the N digits is set to the high level, and the remaining control signals are set to the low level.

The zero-th digit output unit 321 outputs a least significant bit (LSB) of a bit string indicating the count value of the upper limit-side counter 320, in other words, outputs the zero-th digit bit. The zero-th digit output unit 321 is implemented by, for example, a toggle flip-flop, and inverts a held value every time the comparison result COMP+ falls and sets the held value to the zero-th digit bit, and outputs the value to the first digit output unit 322 and the switch 324.

The first digit output unit 322 outputs the first digit bit of the bit string indicating the count value. The first digit output unit 322 is implemented by, for example, a toggle flip-flop, and inverts the held value every time the zero-th digit falls and sets the held value to first digit bit, and outputs the value to the second digit output unit 323 and the switch 325.

The second digit output unit 323 outputs the second digit bit of the bit string indicating the count value. The second digit output unit 323 is implemented by, for example, a toggle flip-flop, and inverts the held value every time the first digit falls and outputs the held value as the second digit bit.

The switch 324 outputs the zero-th digit bit as the detection signal DET+ to the transfer unit 380 in the case where the control signal SW1+ is at the high level.

The switch 325 outputs the first digit bit as the detection signal DET+ to the transfer unit 380 in the case where the control signal SW2+ is at the high level.

The switch 326 outputs the second digit bit as the detection signal DET+ to the transfer unit 380 in the case where the control signal SW4+ is at the high level.

The configurations of the n-th digit output unit and the switches of the third digit and subsequent digits are similar to those of up to the second digit. With the above-described configuration, the upper limit-side counter 320 outputs the n-th digit bit of the N bits as the detection signal DET+ according to the control signal $SW2^n+$.

The detection signal DET+ indicates whether or not the amount of change in the light amount exceeds the upper limit threshold value of the unit amount of change $(+) \times 2^n$. Furthermore, the upper limit threshold can be changed by the digital control signal SW+.

Here, in a general DVS, the count unit 310 is not arranged, and the comparison result COMP of the comparator is output as it is as the detection signal DET. In this configuration, the upper limit threshold corresponds to the analog upper limit voltage $V_{high}$. Then, to change the threshold, the upper limit voltage $V_{high}$ needs to be increased or decreased. However, if the analog voltage is increased or decreased, a certain time is required to stabilize the increased or decreased voltage, and the time to complete adjustment of the threshold becomes long.

In contrast, in the configuration provided with the count unit 310, the upper limit threshold can be changed by the digital control signal SW+. Therefore, the time required to adjust the threshold can be made shorter than the case of increasing or decreasing the analog voltage. This similarly applies to the lower limit threshold.

Furthermore, to increase or decrease the analog voltage, an analog circuit such as a digital to analog converter (DAC) needs to be operated, which consumes more power than the case of operating a digital circuit. In contrast, the configuration provided with the count unit 310 is only required to operate the digital control circuit 211 and count unit 310, which consumes less power than the case of increasing or decreasing the analog voltage.

The lower limit-side counter 330 includes N n-th digit output units such as a zero-th digit output unit 331, a first digit output unit 332, and a second digit output unit 333, and N switches such as switches 334, 335, and 336. These configurations are similar to those of the upper limit-side counter 320.

Figure 9:
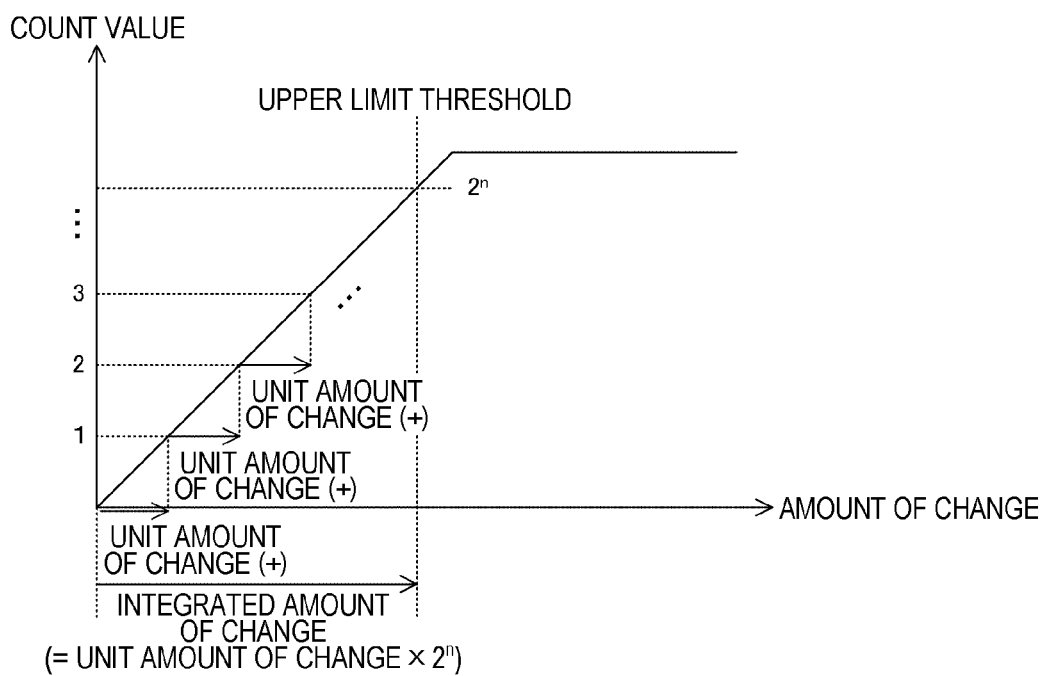
FIG. 9 is a graph illustrating an example of a relationship between an amount of change in a light amount and a count value according to the first embodiment of the present technology.

FIG. 9 is a graph illustrating an example of a relationship between the amount of change in the light amount and the count value according to the first embodiment of the present technology. In FIG. 9, the vertical axis represents the upper limit-side count value, and the horizontal axis represents the amount of change in the light amount.

The upper limit-side counter 320 counts up the count value every time the amount of change in the light amount exceeds the unit amount of change (+). Furthermore, the upper limit-side counter 320 outputs the n-th digit bit as the detection signal DET+. In the case where the upper limit-side counter 320 is the binary counter, and an integrated amount of change of the unit amount of change $(+) \times 2^n$ is set as the upper limit threshold, the n-th digit bit (detection signal DET+) indicates whether or not the amount of change in the light amount exceeds the upper limit threshold (in other words, the presence or absence of an on-event). As described above, this upper limit threshold is variable and can be easily changed by the control signal SW+. Similarly, the lower limit threshold can be easily changed regarding detection of an off-event.

Figure 10:
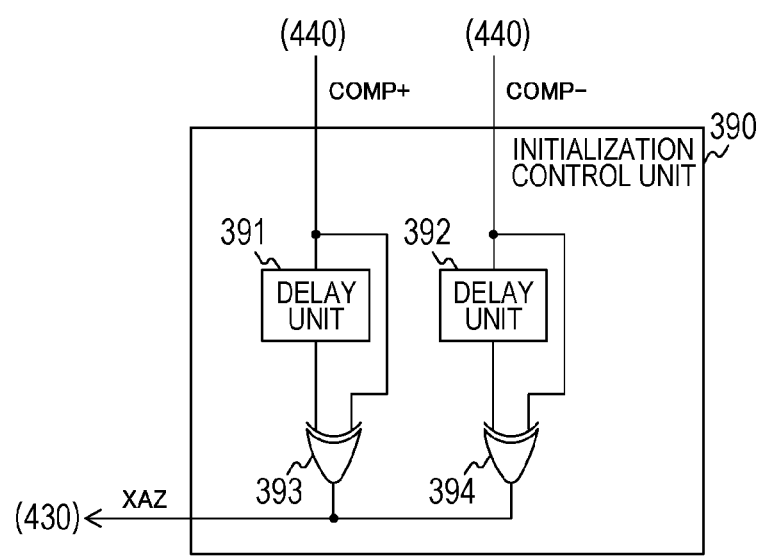
FIG. 10 is a circuit diagram illustrating a configuration example of an initialization control unit according to the first embodiment of the present technology.

FIG. 10 is a circuit diagram illustrating a configuration example of the initialization control unit 390 according to the first embodiment of the present technology. The initialization control unit 390 includes delay units 391 and 392 and XOR (exclusive logical sum) gates 393 and 394.

The delay unit 391 delays the comparison result COMP+ from the comparator 440. The delay unit 391 supplies a delayed signal to the XOR gate 393. The delay unit 392 delays the comparison result COMP− from the comparator 440. The delay unit 391 supplies a delayed signal to the XOR gate 394.

The XOR gate 393 generates an exclusive logical sum of the comparison results COMP+ before and after the delay. The XOR gate 394 generates an exclusive logical sum of the comparison results COMP− before and after the delay. A pulse signal is generated by these XOR gates 393 and 394. This pulse signal is output as the auto-zero signal XAZ to the differentiator circuit 430.

Figure 11:
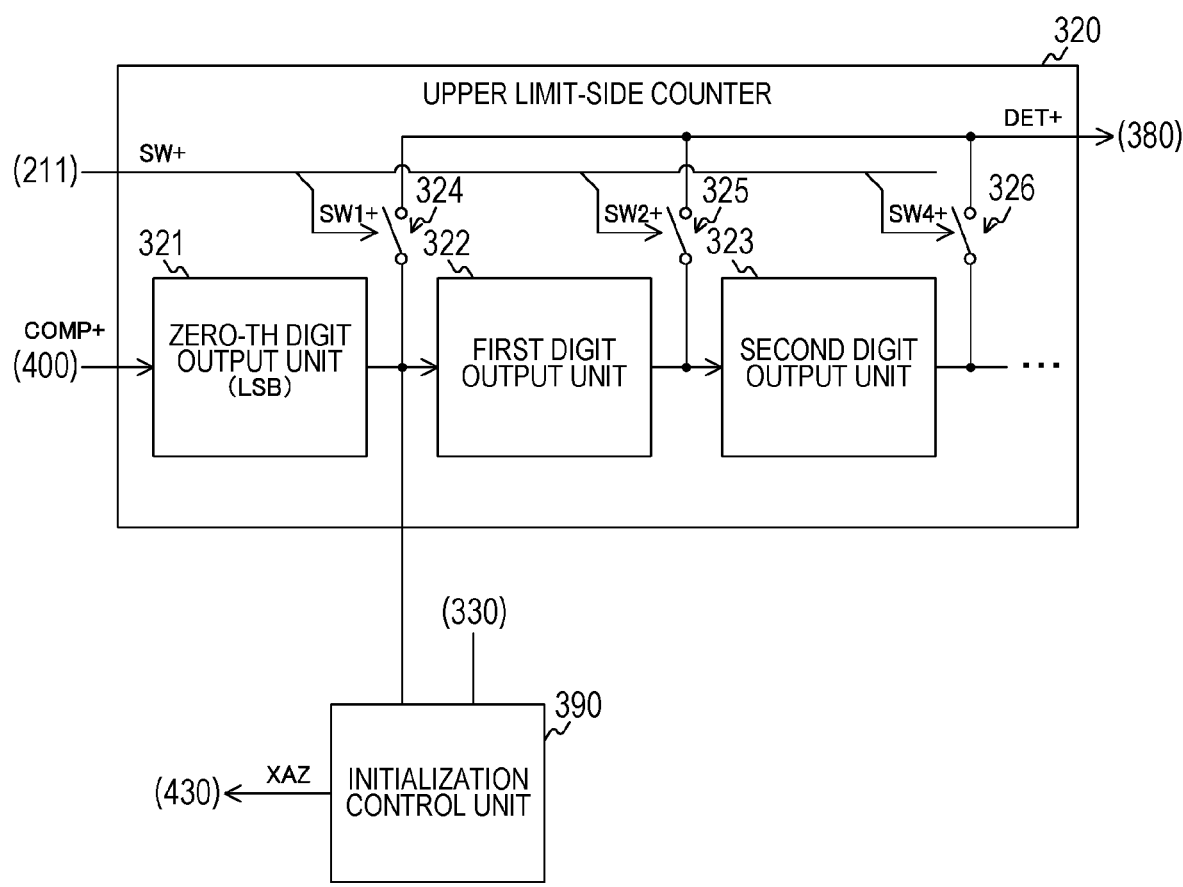
FIG. 11 is a diagram illustrating a connection example of the initialization control unit according to the first embodiment of the present technology.

Note that the initialization control unit 390 generates the auto-zero signal XAZ from the comparison results COMP+ and COMP− but the configuration is not limited thereto. For example, as illustrated in FIG. 11, the initialization control unit 390 can also generate the auto-zero signal XAZ from the LSB of the upper limit-side counter 320 or the lower limit-side counter 330. By detecting the change in the LSB, initialization can be reliably performed every count in this way.

Figure 12:
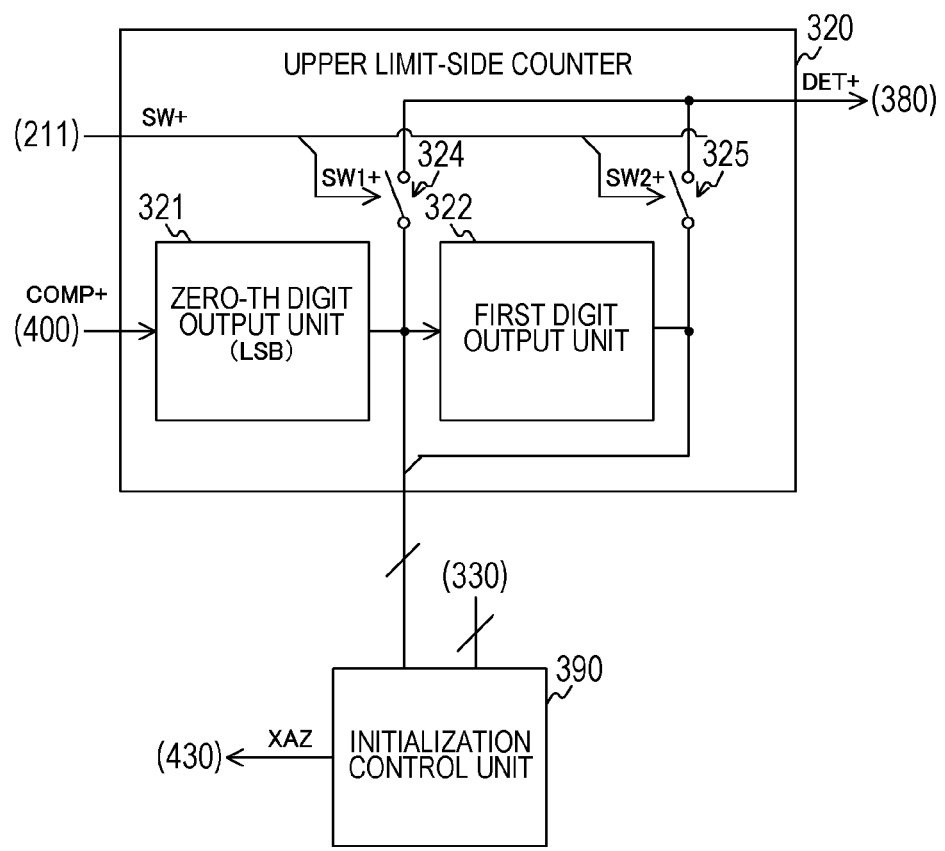
FIG. 12 is a diagram illustrating another connection example of the initialization control unit according to the first embodiment of the present technology.

Alternatively, as illustrated in FIG. 12, the initialization control unit 390 can also generate the auto-zero signal XAZ from a plurality of digits of the upper limit-side counter 320 or the lower limit-side counter 330. For example, in the case where a 2-bit Johnson counter is used as the upper limit-side counter 320 or the lower limit-side counter 330, the count value is counted in binary order of "00", "01", "11" and "10". Therefore, the count start cannot be detected only using the LSB. In this case, the initialization control unit 390 may refer to the zero-th digit and the first digit, and perform initialization when the combination of them becomes "01".

Operation Example of Imaging Device

Figure 13:
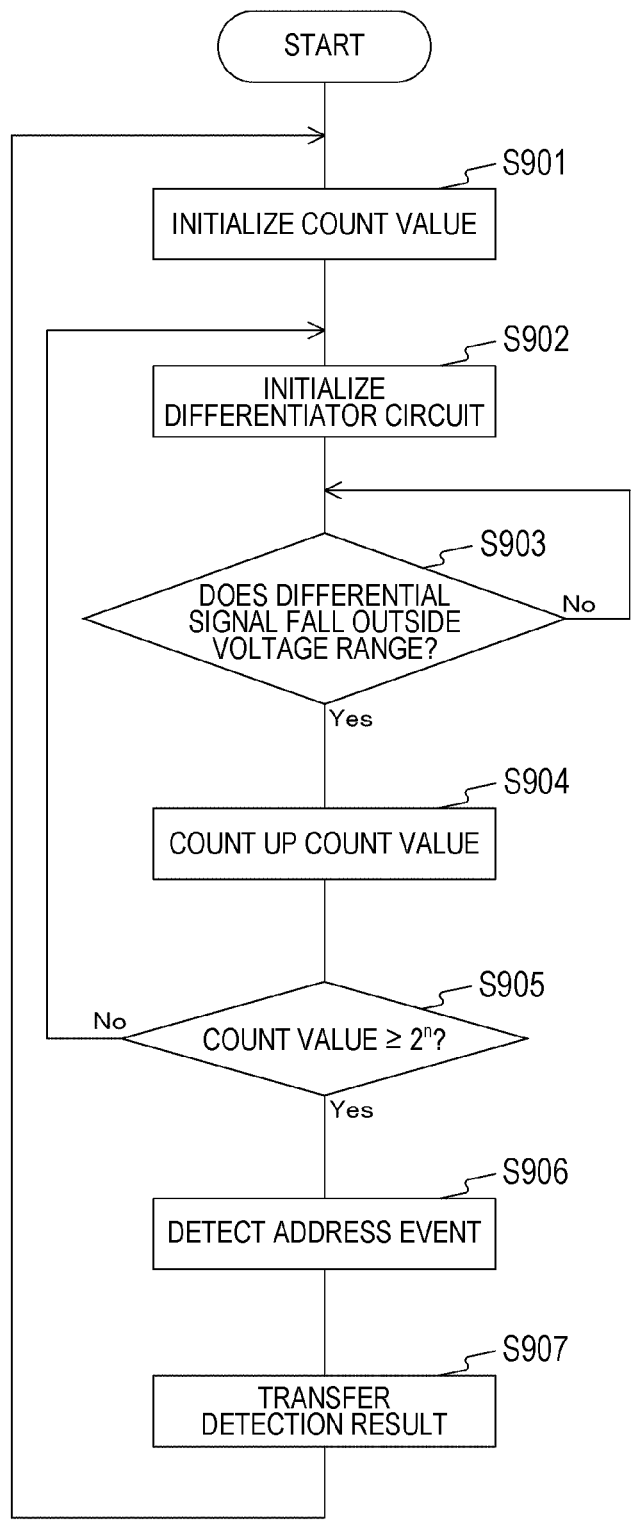
FIG. 13 is a flowchart illustrating an example of an operation of the solid-state image sensor according to the first embodiment of the present technology.

FIG. 13 is a flowchart illustrating an example of an operation of the solid-state image sensor 200 according to the first embodiment of the present technology. This operation is started when, for example, a predetermined application for detecting an address event is executed.

The solid-state image sensor 200 initializes the count value of the count unit 310 (step S901) and initializes the differentiator circuit 430 (step S902). Then, the comparator 440 determines whether or not the differential signal Vout is outside the voltage range from the lower limit voltage $V_{low}$ to the upper limit voltage $V_{high}$ (step S903). In a case where the differential signal Vout is within the voltage range (step S903: No), the comparator 440 repeats step S903.

On the other hand, in a case where the differential signal Vout is outside the voltage range (step S903: Yes), the count unit 310 counts up the count value (step S904) and determines whether or not the count value on the upper limit side or the lower limit side is equal to or larger than $2^n$ (step S905). In a case where the count value is less than $2^n$ (step S905: No), the solid-state image sensor 200 repeatedly executes step S902 and the subsequent steps.

In a case where the count value is equal to or larger than $2^n$ (step S905: Yes), the count unit 310 detects the address event (step S906), and the transfer unit 380 transfers the detection signal (step S907). After step S907, the solid-state image sensor 200 repeatedly executes step S901 and the subsequent steps.

As described above, according to the first embodiment of the present technology, the count unit 310 counts the count value on the basis of the comparison result COMP and outputs the n-th digit bit of the count value as the detection signal. Therefore, $2^n$ corresponding to the threshold can be adjusted by the digital control signal SW. Thereby, the time required for adjustment can be made shorter than the case of adjusting the threshold using an analog voltage.

[First Modification]

In the above-described first embodiment, the comparator 440 compares both the upper limit voltage and the lower limit voltage with the differential signal Vout. However, the comparator 440 can compare a variable voltage with the differential signal Vout. A first modification of the first embodiment is different from the first embodiment in that that comparator 440 compares a variable voltage with the differential signal Vout.

Figure 14:
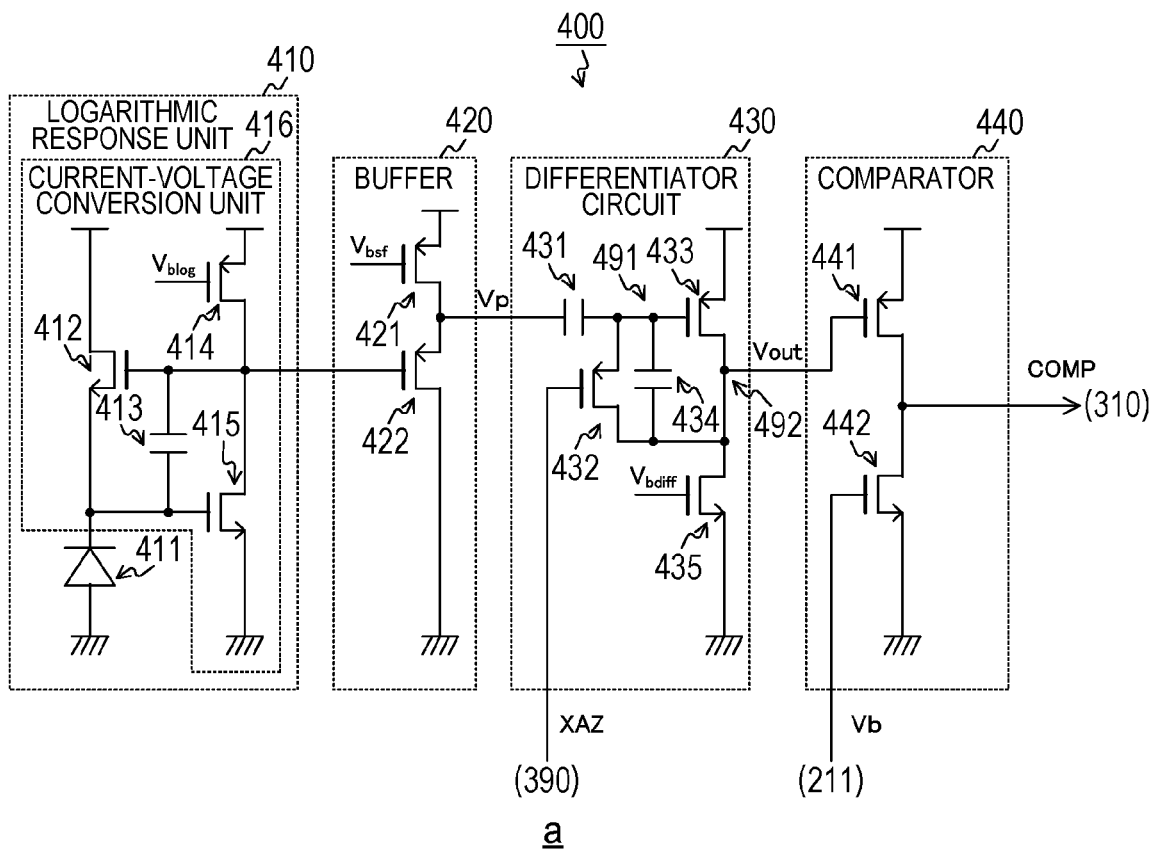
FIG. 14 is a diagram illustrating a voltage comparison unit and a control example of a control circuit according to a first modification of the first embodiment of the present technology.
Figure 14:
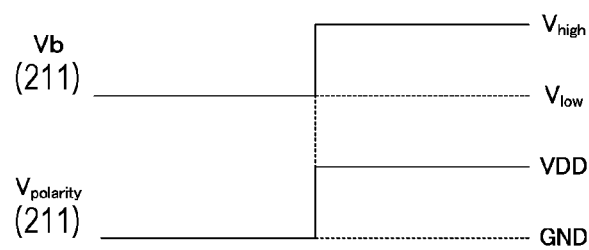

FIG. 14 is a diagram illustrating the voltage comparison unit 400 and a control example of the control circuit 211 according to the first modification of the first embodiment of the present technology. a in FIG. 14 is a circuit diagram illustrating a configuration example of the voltage comparison unit 400 according to the first modification of the first embodiment. b in FIG. 14 is a graph illustrating a control example by the control circuit 211 according to the first modification of the first embodiment.

As illustrated in a in FIG. 14, in the voltage comparison unit 400 of the first modification, the P-type transistor 443 and the N-type transistor 444 are not provided in the comparator 440. Furthermore, a variable voltage Vb is input to the comparator 440 as a threshold voltage instead of the upper limit voltage and the lower limit voltage. The variable voltage Vb is generated by the control circuit 211, for example. The comparator 440 outputs the comparison result COMP with respect to the variable voltage Vb to the count unit 310.

Furthermore, as illustrated in b in FIG. 14, the value of the variable voltage Vb is controlled by the control circuit 211 to be a different value of the upper limit voltage $V_{high}$ or the lower limit voltage $V_{low}$ in a time division manner. Furthermore, the control circuit 211 generates a polarity signal $V_{polarity}$ indicating whether the variable voltage Vb is the upper limit voltage $V_{high}$ or the lower limit voltage $V_{low}$, and supplies the polarity signal $V_{polarity}$ to the count unit 310. For example, when the variable voltage Vb is the upper limit voltage $V_{high}$, the polarity signal $V_{polarity}$ is set to the high level (power supply voltage VDD or the like). On the other hand, when the variable voltage Vb is the lower limit voltage $V_{low}$, the polarity signal $V_{polarity}$ is set to the low level (ground voltage GND or the like).

Figure 15:
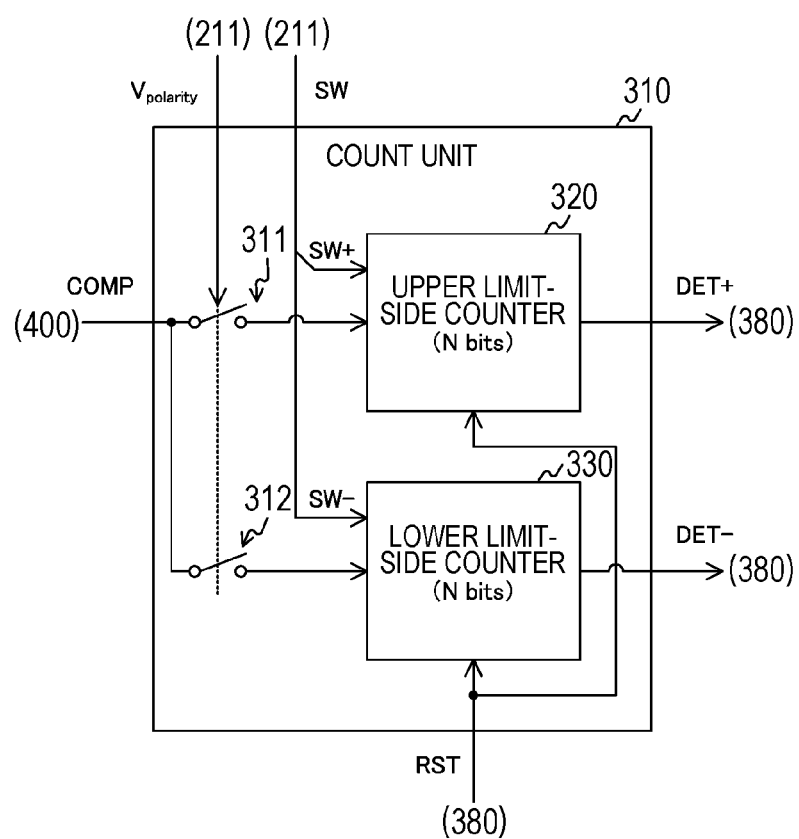
FIG. 15 is a block diagram illustrating a configuration example of a count unit according to the first modification of the first embodiment of the present technology.

FIG. 15 is a block diagram illustrating a configuration example of the count unit 310 according to the first modification of the first embodiment of the present technology. The count unit 310 according to the first modification of the first embodiment differs from that of the first embodiment in further including switches 311 and 312

The switch 311 opens and closes a path between the voltage comparison unit 400 and the upper limit-side counter 320 according to the polarity signal $V_{polarity}$ from the control circuit 211. The switch 312 opens and closes a path between the voltage comparison unit 400 and the lower limit-side counter 330 according to the polarity signal $V_{polarity}$. When the polarity signal $V_{polarity}$ is at the high level (that is, the variable voltage Vb is the upper limit voltage $V_{high}$), the switch 311 is closed and the switch 312 is opened. On the other hand, when the polarity signal $V_{polarity}$ is at the low level (that is, the variable voltage Vb is the lower limit voltage $V_{low}$), the switch 311 is opened and the switch 312 is closed. Note that the switch 311 is an example of an upper limit-side switch described in the claims, and the switch 312 is an example of a lower limit-side switch described in the claims.

As described above, according to the first modification of the first embodiment of the present technology, the comparator 440 compares the variable voltage with the differential signal Vout. Therefore, transistors in the comparator 440 can be reduced.

[Second Modification]

In the above-described first embodiment, the count unit 310 is arranged for each pixel 300. However, the number of count units 310 becomes larger as the number of pixels becomes larger, and a circuit scale of the solid-state image sensor 200 may increase. The solid-state image sensor 200 according to a second modification of the first embodiment is different from that of the first embodiment in that a plurality of pixels 300 shares the count unit 310.

Figure 16:
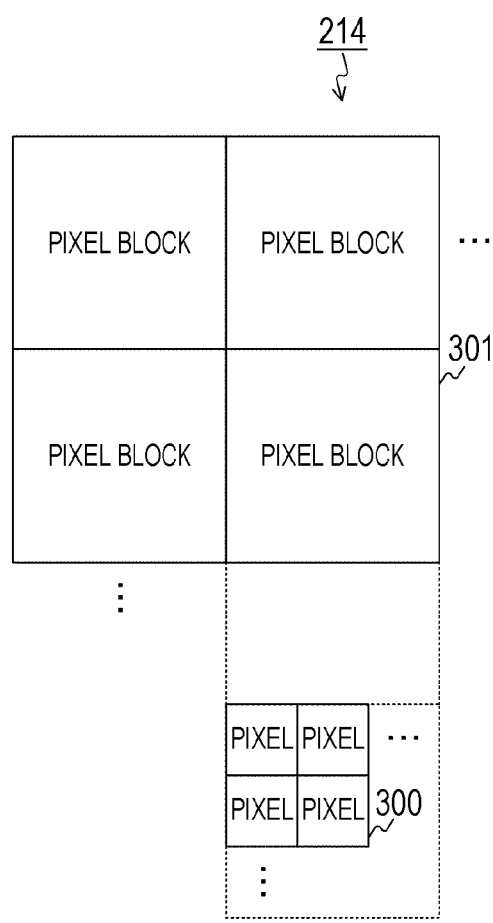
FIG. 16 is a plan view illustrating a configuration example of a pixel array unit according to a second modification of the first embodiment of the present technology.

FIG. 16 is a plan view illustrating a configuration example of the pixel array unit 214 according to the second modification of the first embodiment of the present technology. The pixel array unit 214 according to the modification of the first embodiment is different from that of the first embodiment in being divided by a plurality of pixel blocks 301.

In each pixel block 301, M (M is an integer of 2 or more) pixels 300 are arranged. These M pixels 300 share one count unit 310.

Figure 17:
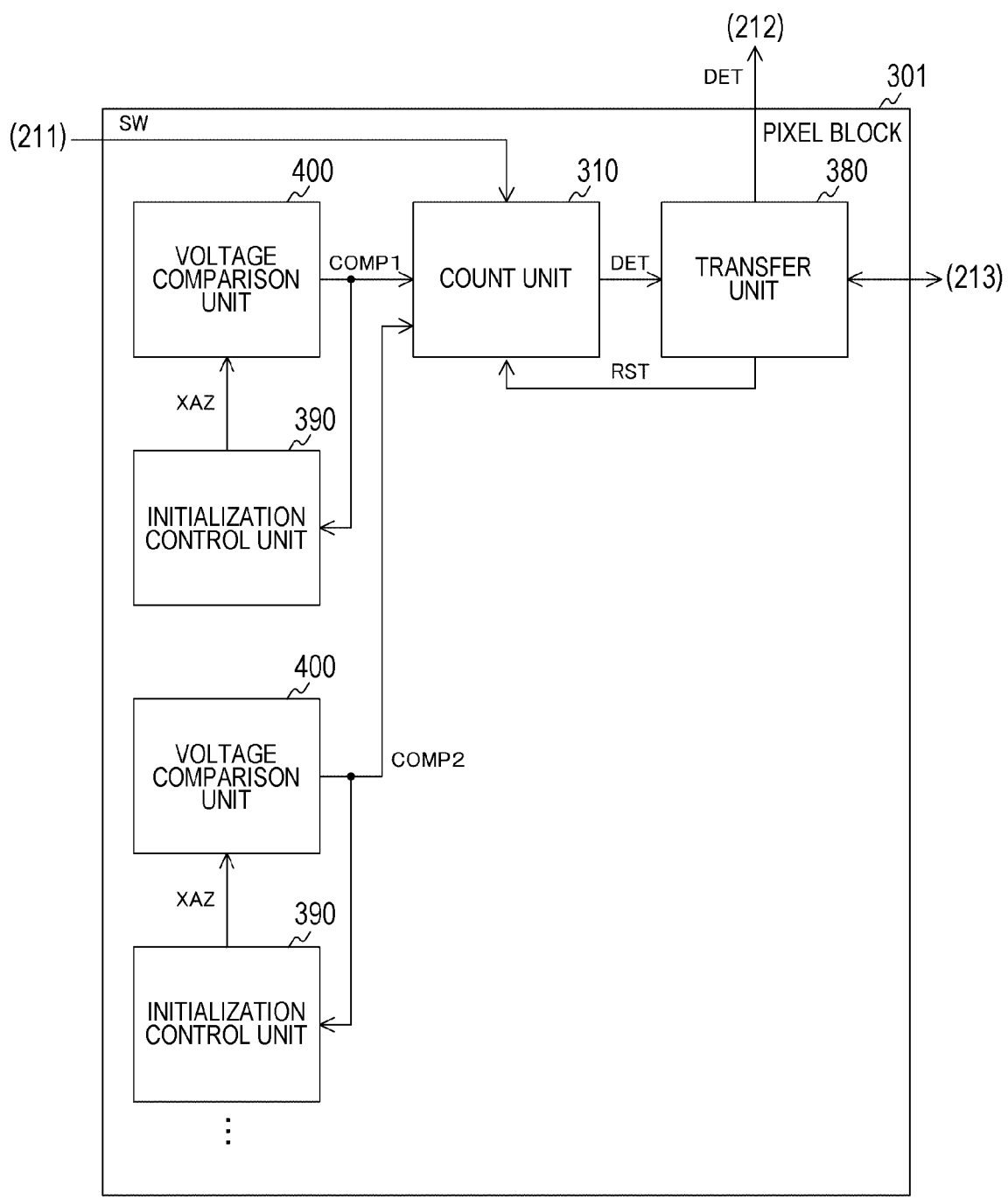
FIG. 17 is a block diagram illustrating a configuration example of a pixel block according to the second modification of the first embodiment of the present technology.

FIG. 17 is a block diagram illustrating a configuration example of the pixel block 301 according to the second modification of the first embodiment of the present technology. The pixel block 301 according to the second modification of the first embodiment includes M voltage comparison units 400, M initialization control units 390, the count unit 310, and the transfer unit 380.

The m-th (m is an integer from 0 to M−1) voltage comparison unit 400 outputs a comparison result COMPm to the count unit 310 and the m-th initialization control unit 390. The m-th initialization control unit 390 supplies the auto-zero signal XAZ to the m-th voltage comparison unit 400.

The m-th initialization control unit 390, the m-th initialization control unit 390, the count unit 310, and the transfer unit 380 configure the m-th pixel 300. That is, the M pixels 300 share the count unit 310 and the transfer unit 380.

Figure 18:
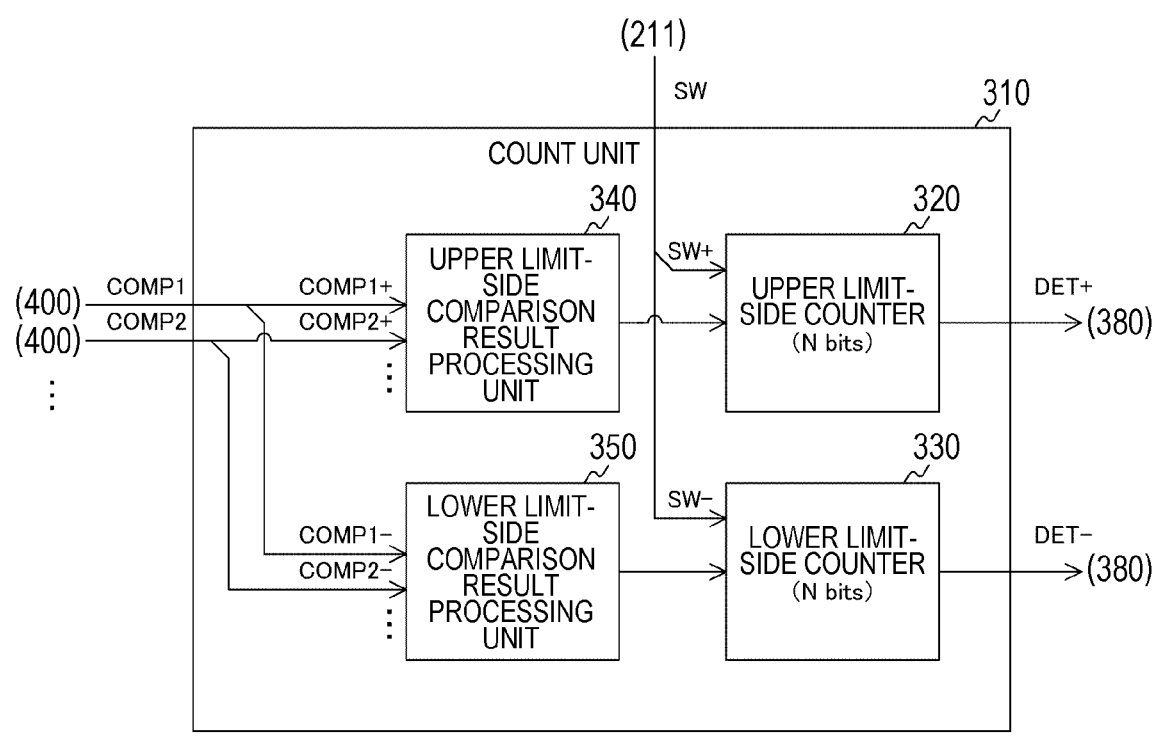
FIG. 18 is a block diagram illustrating a configuration example of a count unit according to the second modification of the first embodiment of the present technology.

FIG. 18 is a block diagram illustrating a configuration example of the count unit 310 according to the second modification of the first embodiment of the present technology. The count unit 310 according to the second modification of the first embodiment differs from that of the first embodiment in further including an upper limit-side comparison result processing unit 340 and a lower limit-side comparison result processing unit 350.

The upper limit-side comparison result processing unit 340 processes the comparison result COMPm+ with respect to the upper limit voltage of each of the M pixels to generate a one-bit signal. The upper limit-side comparison result processing unit 340 supplies the resultant bit to the upper limit-side counter 320.

The lower limit-side comparison result processing unit 350 processes the comparison result COMPm− with respect to the lower limit voltage of each of the M pixels to generate a one-bit signal. The lower limit-side comparison result processing unit 350 supplies the resultant bit to the lower limit-side counter 330.

Figure 19:
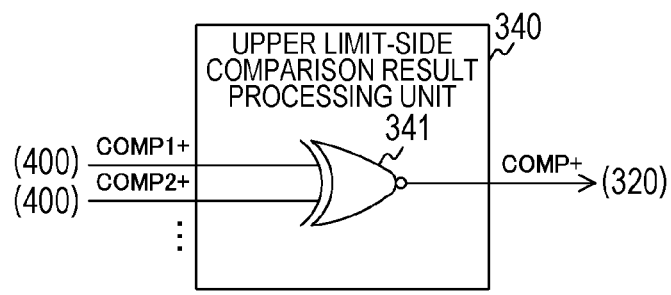
FIG. 19 is circuit diagrams illustrating a configuration example of an upper limit-side comparison result processing unit according to the second modification of the first embodiment of the present technology.
Figure 19:
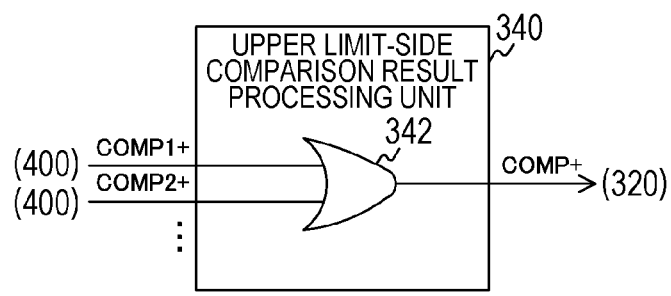
Figure 19:
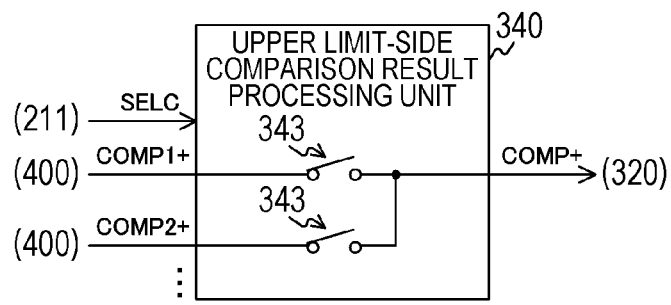

FIG. 19 is circuit diagrams illustrating a configuration example of the upper limit-side comparison result processing unit 340 according to the second modification of the first embodiment of the present technology. a in FIG. 19 illustrates an example of a circuit diagram of the upper limit-side comparison result processing unit 340 in the case of using an XOR gate. b in FIG. 19 illustrates an example of a circuit diagram of the upper limit-side comparison result processing unit 340 in the case of using an OR (logical sum) gate. c in FIG. 19 illustrates an example of a circuit diagram of the upper limit-side comparison result processing unit 340 in the case of using a switch.

As illustrated in a in FIG. 19, an XOR gate 341 is arranged in the upper limit-side comparison result processing unit 340. The XOR gate 341 outputs an exclusive logical sum of the M comparison results COMPm+ to the upper limit-side counter 320 as the comparison result COMP+ (processing result).

Note that, as illustrated in b in FIG. 19, an OR gate 342 may be arranged instead of the XOR gate 341 in the upper limit-side comparison result processing unit 340. The OR gate 342 outputs a logical sum of the M comparison results COMPm+ to the upper limit-side counter 320 as the comparison result COMP+.

Furthermore, as illustrated in c in FIG. 19, M switches 343 can be arranged instead of the XOR gate 341 in the upper limit-side comparison result processing unit 340. The m-th switch 343 outputs the m-th comparison result COMPm+ to the upper limit-side counter 320 as the comparison result COMP+ according to a selection signal SELC from the control circuit 211. The control circuit 211 outputs any one of the M comparison results COMPm+ according to the selection signal SELC. The comparison result to be output is switched, for example, at regular intervals.

For example, it is assumed that the comparison result COMP1+ is at the high level over a certain period, and the comparison result COMP2+ is at the high level over a certain period with a short delay. Furthermore, it is assumed that the high-level periods of the comparison results COMP1+ and COMP2+ partially overlap. In this case, in the configuration provided with the XOR gate 341, the upper limit-side counter 320 counts up twice. Meanwhile, in the configuration provided with the OR gate 342, the upper limit-side counter 320 counts up only once. In this way, the configuration provided with the OR gate 342 can reduce the number of counts.

Furthermore, in the configuration provided with the switches 343, only some comparison results are selected from among the M pixels, and the rest can be thinned out without being output.

Note that the configuration of the lower limit-side comparison result processing unit 350 is similar to that of the upper limit-side comparison result processing unit 340.

As described above, according to the second modification of the first embodiment of the present technology, the plurality of pixels 300 shares one count unit 310. Therefore, the circuit scale of the solid-state image sensor 200 can be reduced as compared with the case of arranging the count unit 310 for each pixel.

[Third Modification]

In the above-described second modification of the first embodiment, the comparator 440 compares both the upper limit voltage and the lower limit voltage with the differential signal Vout. However, the comparator 440 can compare a variable voltage with the differential signal Vout. A third modification of the first embodiment is an application of the third modification to the second modification.

Figure 20:
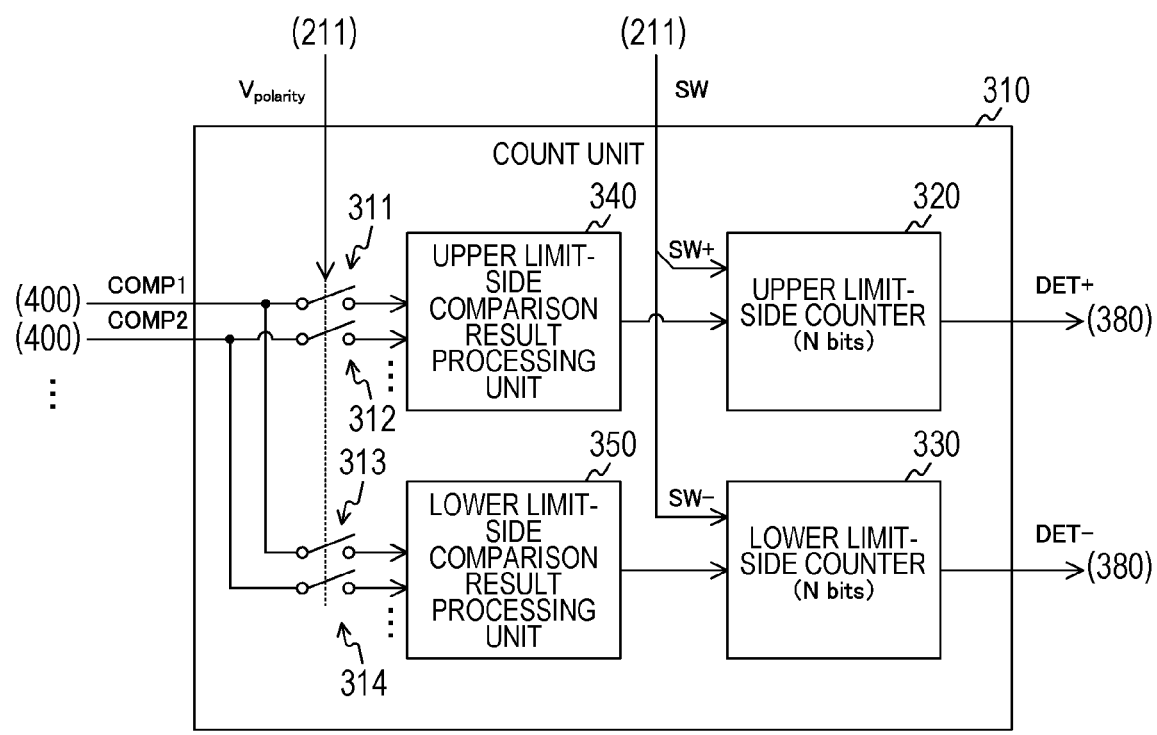
FIG. 20 is a block diagram illustrating a configuration example of a count unit according to a third modification of the first embodiment of the present technology.

FIG. 20 is a block diagram illustrating a configuration example of the count unit 310 according to the third modification of the first embodiment of the present technology. The configurations of the comparator 440 and the control circuit 211 in the third modification of the first embodiment are similar to those of the first modification of the first embodiment.

Furthermore, the count unit 310 of the third modification is provided with a plurality of switches such as switches 311 to 314. The number of switches is twice the input comparison results COMPm. For example, in a case where the comparison results COMP1 and COMP2 are input, the four switches 311 to 314 are arranged.

The switch 311 opens and closes the path between the voltage comparison unit 400 corresponding to the comparison result COMP1 and the upper limit-side comparison result processing unit 340 according to the polarity signal $V_{polarity}$ from the control circuit 211. The switch 312 opens and closes the path between the voltage comparison unit 400 corresponding to the comparison result COMP2 and the upper limit-side comparison result processing unit 340 according to the polarity signal $V_{polarity}$. The switch 313 opens and closes the path between the voltage comparison unit 400 corresponding to the comparison result COMP1 and the lower limit-side comparison result processing unit 350 according to the polarity signal $V_{polarity}$. The switch 314 opens and closes the path between the voltage comparison unit 400 corresponding to the comparison result COMP2 and the lower limit-side comparison result processing unit 350 according to the polarity signal $V_{polarity}$.

When the polarity signal $V_{polarity}$ is at the high level (that is, the variable voltage Vb is the upper limit voltage $V_{high}$), the switches 311 and 312 are closed and the switches 313 and 314 are opened. On the other hand, when the polarity signal $V_{polarity}$ is at the low level (that is, the variable voltage Vb is the lower limit voltage $V_{low}$), the switches 311 and 312 are opened and the switches 313 and 314 are closed. Note that the switches 311 and 312 are an example of the upper limit-side switches described in the claims, and the switches 313 and 314 are an example of the lower limit-side switches described in the claims.

In a case where there are three or more comparison results, one switch is added to each of the upper limit side and the lower limit side every time the comparison result increases by one.

As described above, according to the third modification of the first embodiment of the present technology, the comparator 440 compares the variable voltage with the differential signal Vout. Therefore, transistors in the comparator 440 can be reduced.

2. Second Embodiment

In the above-described first embodiment, the number of times the differential signal Vout becomes higher than the upper limit voltage and the number of times the differential signal becomes lower than the upper limit voltage have been individually counted by the upper limit-side counter 320 and the lower limit-side counter 330. However, in this configuration, a periodic change in brightness and darkness due to flicker is detected as an address event when the flicker occurs by a fluorescent lamp or the like, and the number of times the address event is detected may increase. A count unit 310 according to the second embodiment is different from that of the first embodiment in that an up-down counter is arranged to suppress an influence of flicker.

Figure 21:
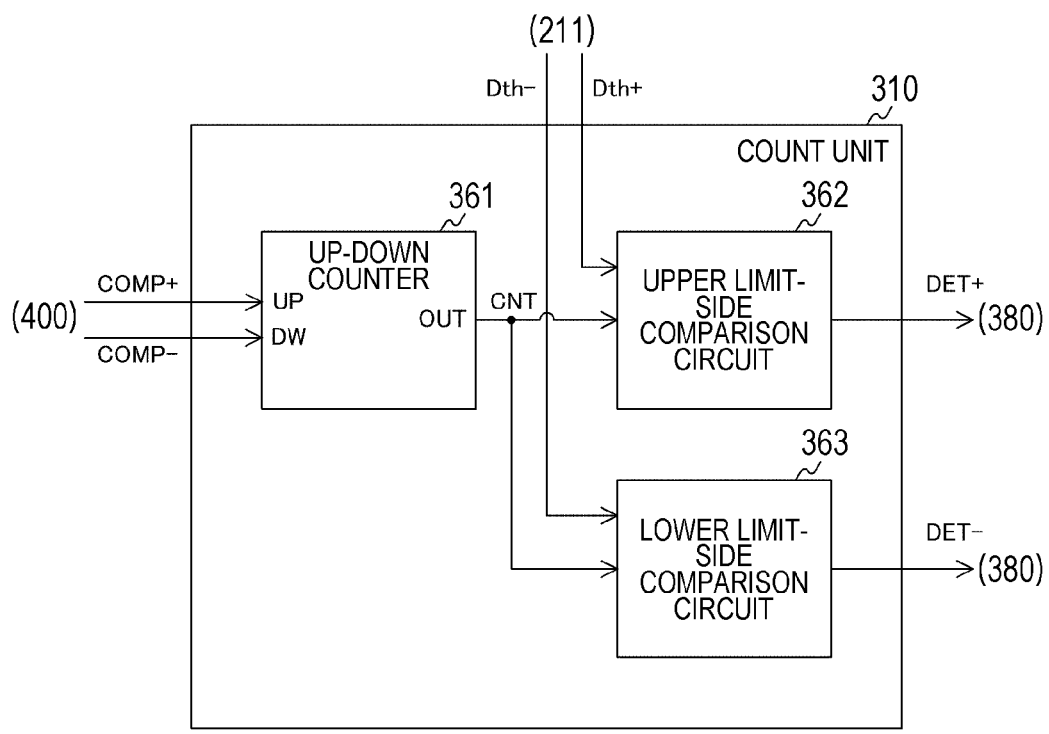
FIG. 21 is a block diagram illustrating a configuration example of a count unit according to a second embodiment of the present technology.

FIG. 21 is a block diagram illustrating a configuration example of the count unit 310 according to the second embodiment of the present technology. The count unit 310 according to the second embodiment includes an up-down counter 361, an upper limit-side comparison circuit 362, and a lower limit-side comparison circuit 363.

The up-down counter 361 performs processing of incrementing a count value CNT when a high-level comparison result COMP+ is input, and performs processing of decrementing the count value CNT when a low-level comparison result COMP- is input. That is, the count value CNT is counted up when a differential signal Vout becomes higher than an upper limit voltage, and the count value CNT is counted down when the differential signal Vout becomes lower than a lower limit voltage. The up-down counter 361 supplies the count value CNT to the upper limit-side comparison circuit 362 and the lower limit-side comparison circuit 363.

Note that the up-down counter 361 performs the increment processing according to the comparison result COMP+ and the decrement processing according to the comparison result COMP-, but the configuration is not limited thereto. The up-down counter 361 can perform the decrement processing according to the comparison result COMP+ and the increment processing according to the comparison result COMP−.

The upper limit-side comparison circuit 362 compares a digital value Dth+ from a control circuit 211 with the count value CNT. Here, the digital value Dth+ indicates an upper limit threshold. The upper limit-side comparison circuit 362 outputs a comparison result as a detection signal DET+.

The lower limit-side comparison circuit 363 compares a digital value Dth− from the control circuit 211 with the count value CNT. Here, the digital value Dth− indicates a lower limit threshold. The lower limit-side comparison circuit 363 outputs a comparison result as a detection signal DET−.

For example, it is assumed that a light amount increases for a fixed time, and then the light amount decreases for a fixed time. It is assumed that the number of times the differential signal Vout becomes higher than the upper limit voltage due to the increase in the light amount is ten times, and the number of times the differential signal Vout becomes lower than the lower limit voltage due to the decrease in the light amount is ten times. Furthermore, $2^n$ indicating the upper limit threshold and the lower limit threshold is set to "8". In the first embodiment in which the upper limit-side counter 320 and the lower limit-side counter 330 individually count the count values, the count value of each of the upper limit-side counter 320 and the lower limit-side counter 330 exceeds "8", and the on-event and the off-event are detected once.

In contrast, in the case of arranging the up-down counter 361, for example, the initial value of the count value is set to "−5", the digital value Dth+ indicating the upper limit-side threshold is set to "+8", and the digital value Dth− indicating the lower limit-side threshold is set to "−8". Thereby, the count value is incremented to "+5" at the time of the increase in the light amount, and then the count value is decremented to "−5". Since the count value is within the range of "−8" to "+8", neither an on-event nor an off-event is detected. In this way, the count-up by the comparison result COMP+ and the count-down by the comparison result COMP− are offset each other, so that the influence of flicker can be suppressed.

Furthermore, in a case where a counter outputs only one of digits as in the first embodiment, for example, in a binary counter, the threshold cannot be adjusted to a value between $2^n$ (8, for example) and $2^{n+1}$ (16, for example). In contrast, the up-down counter 361 outputs not only the n-th digit but also the entire count value CNT, and compares the count value CNT with the digital value (threshold) in a subsequent stage. As a result, the threshold between $2^n$ and $2^{n+1}$ can be set, and the threshold can be more finely adjusted.

Note that the up-down counter 361 can also output the $n_+$th digit corresponding to the upper limit threshold and the n-th digit corresponding to the lower limit threshold as the detection signals DET+ and DET−, as in the first embodiment. Here, $n_+$ and $n_-$ are integers from 0 to N−1, which are different from each other. In this case, the upper limit-side comparison circuit 362 and the lower limit-side comparison circuit 363 are unnecessary. Furthermore, although both the upper limit-side comparison circuit 362 and the lower limit-side comparison circuit 363 are arranged in the count unit 310, only one of them can be arranged.

As described above, according to the second embodiment of the present technology, the up-down counter 361 performs the increment processing according to the comparison result COMP+ and the decrement processing according to the comparison result COMP−, thereby offsetting an increase amount due to the increase in the light amount and a decrease amount due to the decrease in the light amount. Thereby, the influence by flicker in which the light amount periodically increases and decreases can be suppressed.

[Modification]

In the above-described second embodiment, a comparator 440 compares both the upper limit voltage and the lower limit voltage with the differential signal Vout. However, the comparator 440 can compare a variable voltage with the differential signal Vout. A modification of the second embodiment is an application of the first modification of the first embodiment to the second modification.

Figure 22:
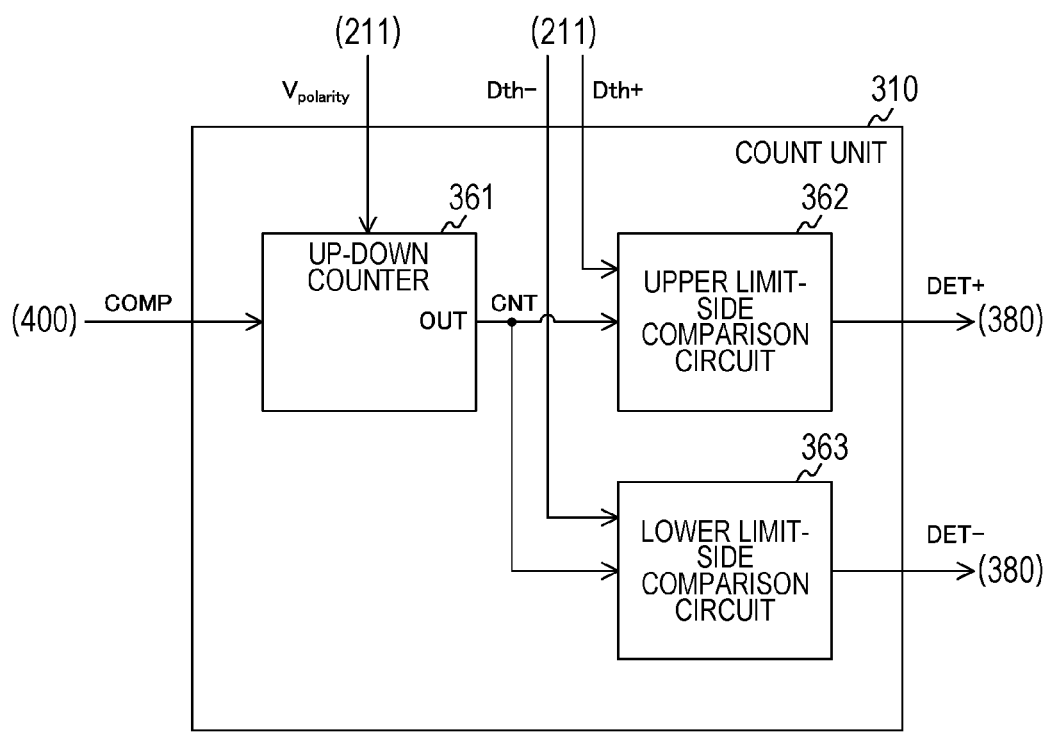
FIG. 22 is a block diagram illustrating a configuration example of a count unit according to a modification of the second embodiment of the present technology.

FIG. 22 is a block diagram illustrating a configuration example of a count unit 310 according to the modification of the second embodiment of the present technology. The configurations of the comparator 440 and a control circuit 211 in the modification of the second embodiment are similar to those of the first modification of the first embodiment.

Furthermore, the comparison result COMP from a voltage comparison unit 400 and the polarity signal $V_{polarity}$ from the control circuit 221 are input to the up-down counter 361 of the modification of the second embodiment. The up-down counter 361 performs processing of incrementing the count value CNT according to the comparison result COMP when the high-level polarity signal $V_{polarity}$ is input. On the other hand, the up-down counter 361 performs processing of decrementing the count value CNT according to the comparison result COMP when the low-level polarity signal $V_{polarity}$ is input.

As described above, according to the modification of the second embodiment of the present technology, the comparator 440 compares the variable voltage with the differential signal Vout. Therefore, transistors in the comparator 440 can be reduced.

3. Third Embodiment

In the above-described first embodiment, the solid-state image sensor 200 has performed only detection of an address event. However, there are some cases where capture of image data is required for use of recording a traffic accident state, or the like. A solid-state image sensor 200 according to a third embodiment is different from that in the first embodiment in further capturing image data.

Figure 23:
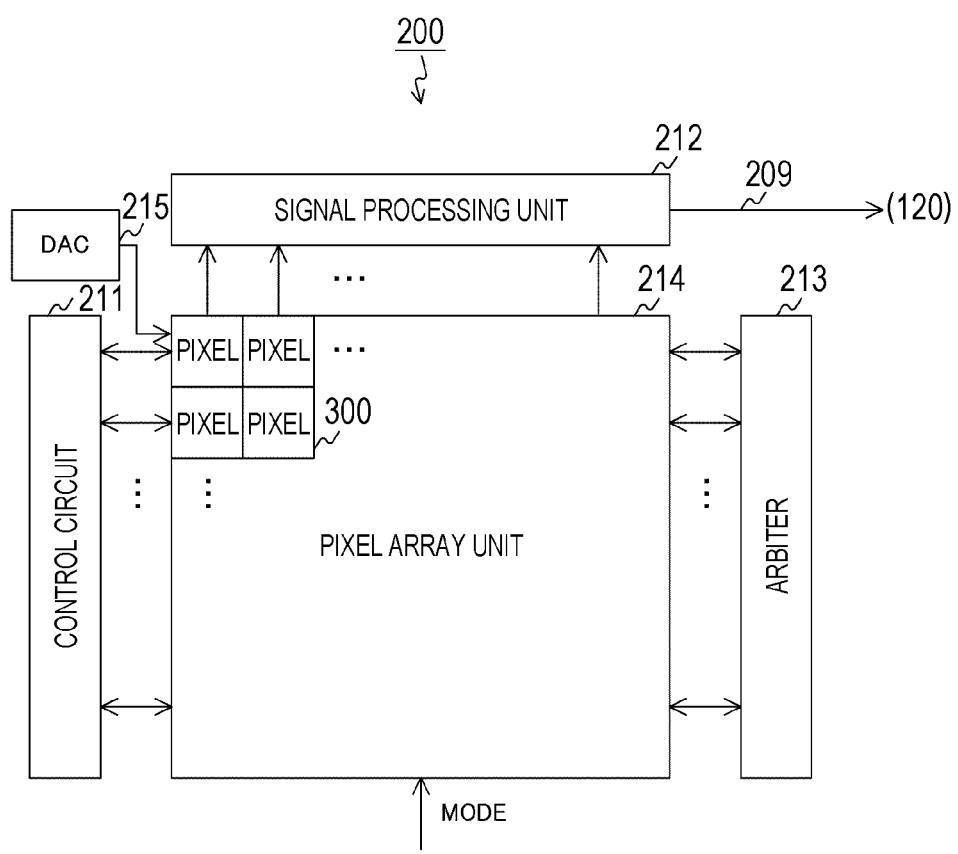
FIG. 23 is a block diagram illustrating a configuration example of a solid-state image sensor according to a third embodiment of the present technology.

FIG. 23 is a block diagram illustrating a configuration example of the solid-state image sensor 200 according to the third embodiment of the present technology. The solid-state image sensor 200 according to the third embodiment is different from that in the first embodiment in further including a DAC 215.

The DAC 215 generates a predetermined reference signal by digital to analog (DA) conversion. For example, a ramp signal in which a level changes in a slope manner is generated as the reference signal. The DAC 215 supplies the reference signal to each of pixels 300.

Furthermore, a mode signal MODE is input to a pixel array unit 214. The mode signal MODE is a signal indicating either an imaging mode or a detection mode. Here, the imaging mode is a mode for capturing image data using the reference signal. Meanwhile, the detection mode is a mode for detecting an address event. The imaging mode is used for, for example, recording a situation of a traffic accident with image data. Meanwhile, the detection mode is used when performing image recognition or the like.

Figure 24:
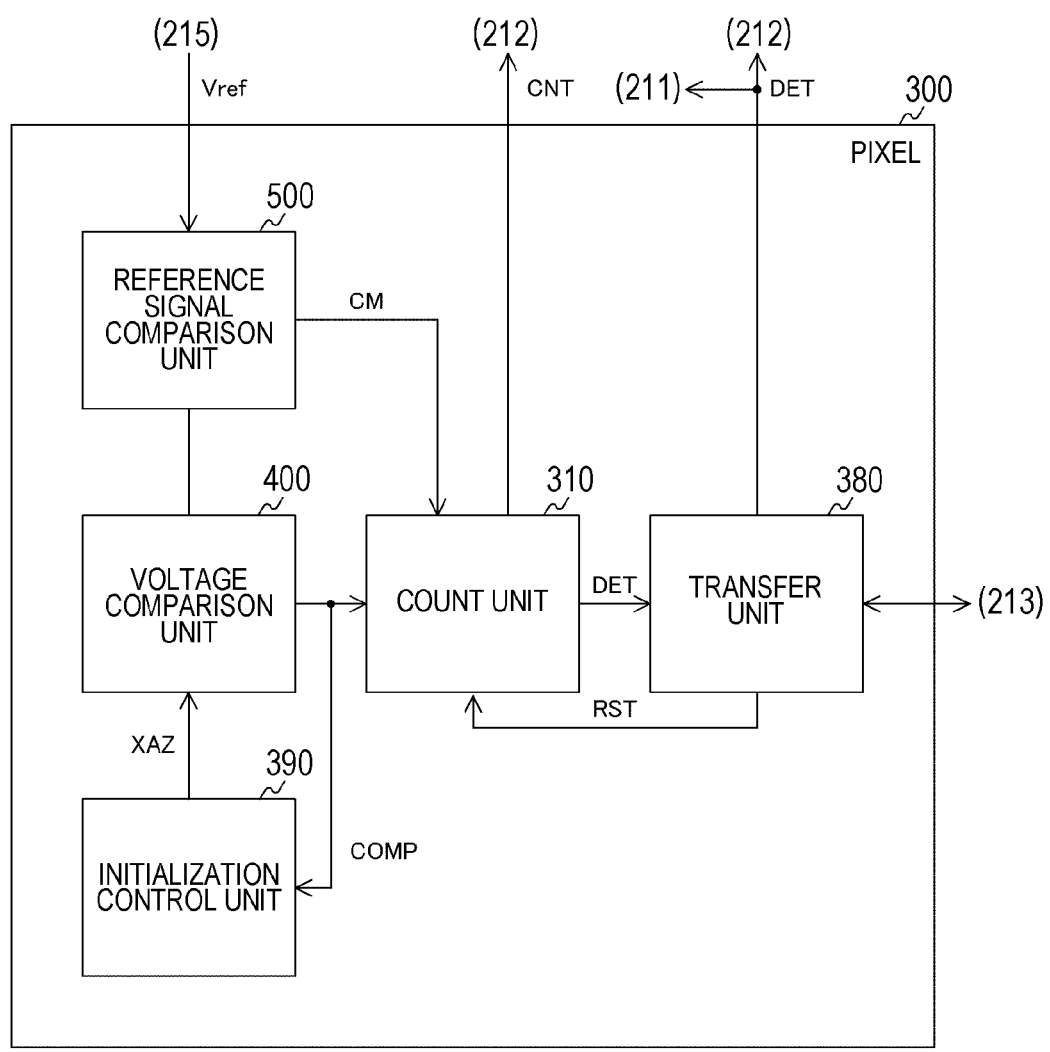
FIG. 24 is a block diagram illustrating a configuration example of a pixel according to the third embodiment of the present technology.

FIG. 24 is a block diagram illustrating a configuration example of the pixel 300 according to the third embodiment of the present technology. The pixel 300 according to the third embodiment is different from the first embodiment in further including a reference signal comparison unit 500.

The reference signal comparison unit 500 compares a pixel signal according to a light amount with a reference signal Vref from the DAC 215. The reference signal comparison unit 500 supplies a comparison result CM to a count unit 310. Details of the reference signal comparison unit 500 will be described below.

In the imaging mode, the count unit 310 according to the third embodiment counts a count value over a period until the comparison result CM is inverted, and supplies a count value CNT to a signal processing unit 212. Meanwhile, in the detection mode, the address event is detected similarly to the first embodiment.

Figure 25:
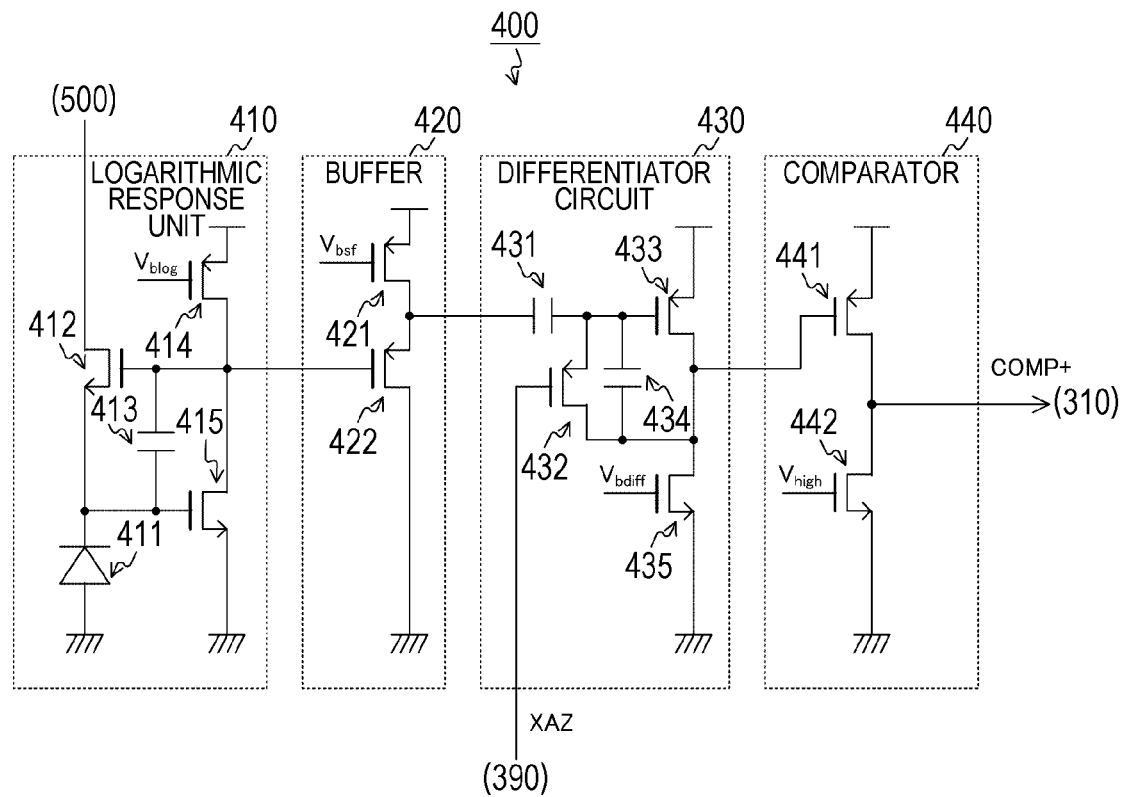
FIG. 25 is a circuit diagram illustrating a configuration example of a voltage comparison unit according to the third embodiment of the present technology.

FIG. 25 is a circuit diagram illustrating a configuration example of a voltage comparison unit 400 according to the third embodiment of the present technology. A P-type transistor 443 and an N-type transistor 444 are not arranged in a comparator 440 in the voltage comparison unit 400 of the third embodiment. Therefore, the comparator 440 outputs only a comparison result COMP+ regarding an on-event.

Furthermore, in a logarithmic response unit 410 of the third embodiment, an N-type transistor 412 supplies a voltage signal obtained by converting a photocurrent to the reference signal comparison unit 500 as the pixel signal.

Figure 26:
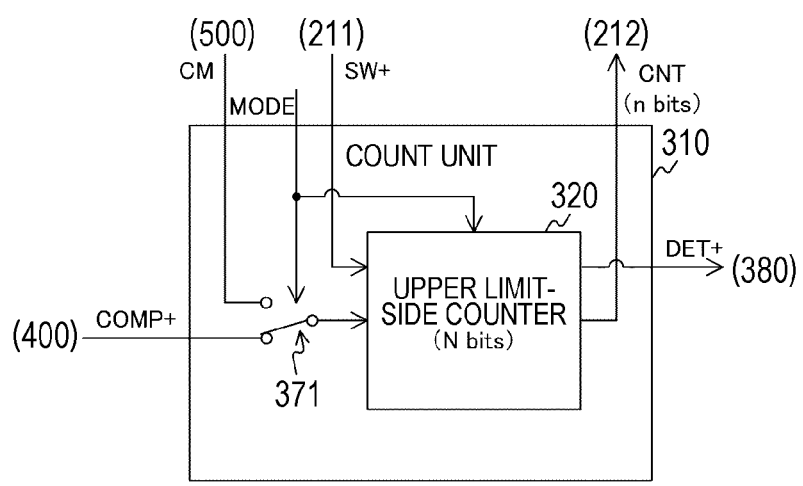
FIG. 26 is a block diagram illustrating a configuration example of a count unit according to the third embodiment of the present technology.

FIG. 26 is a block diagram illustrating a configuration example of the count unit 310 according to the third embodiment of the present technology. The count unit 310 according to the third embodiment includes a selector 371 and an upper limit-side counter 320.

The selector 371 selects either a comparison result COMP+ from the voltage comparison unit 400 or the comparison result CM from the reference signal comparison unit 500 according to the mode signal MODE. The selector 371 selects the comparison result CM in the imaging mode and outputs the comparison result CM to the upper limit-side counter 320, and selects the comparison result COMP+ in the detection mode and outputs the comparison result COMP+ to the upper limit-side counter 320.

The mode signal MODE is further input to the upper limit-side counter 320 of the third embodiment. In the imaging mode, the upper limit-side counter 320 counts the count value CNT over the period until the output signal (comparison result CM) from the selector 371 is inverted from the initial value, and supplies the count value CNT to the signal processing unit 212. The signal processing unit 212 arranges data indicating the count value CNT for each pixel in a two-dimensional lattice manner as pixel data of the pixel to generate image data.

Meanwhile, in the detection mode, the upper limit-side counter 320 counts the count value every time a high-level output signal (comparison result COMP+) is output from the selector 371, and outputs the n-th digit to a transfer unit 380 as a detection signal DET+ of an on-event according to a control signal SW+.

Figure 27:
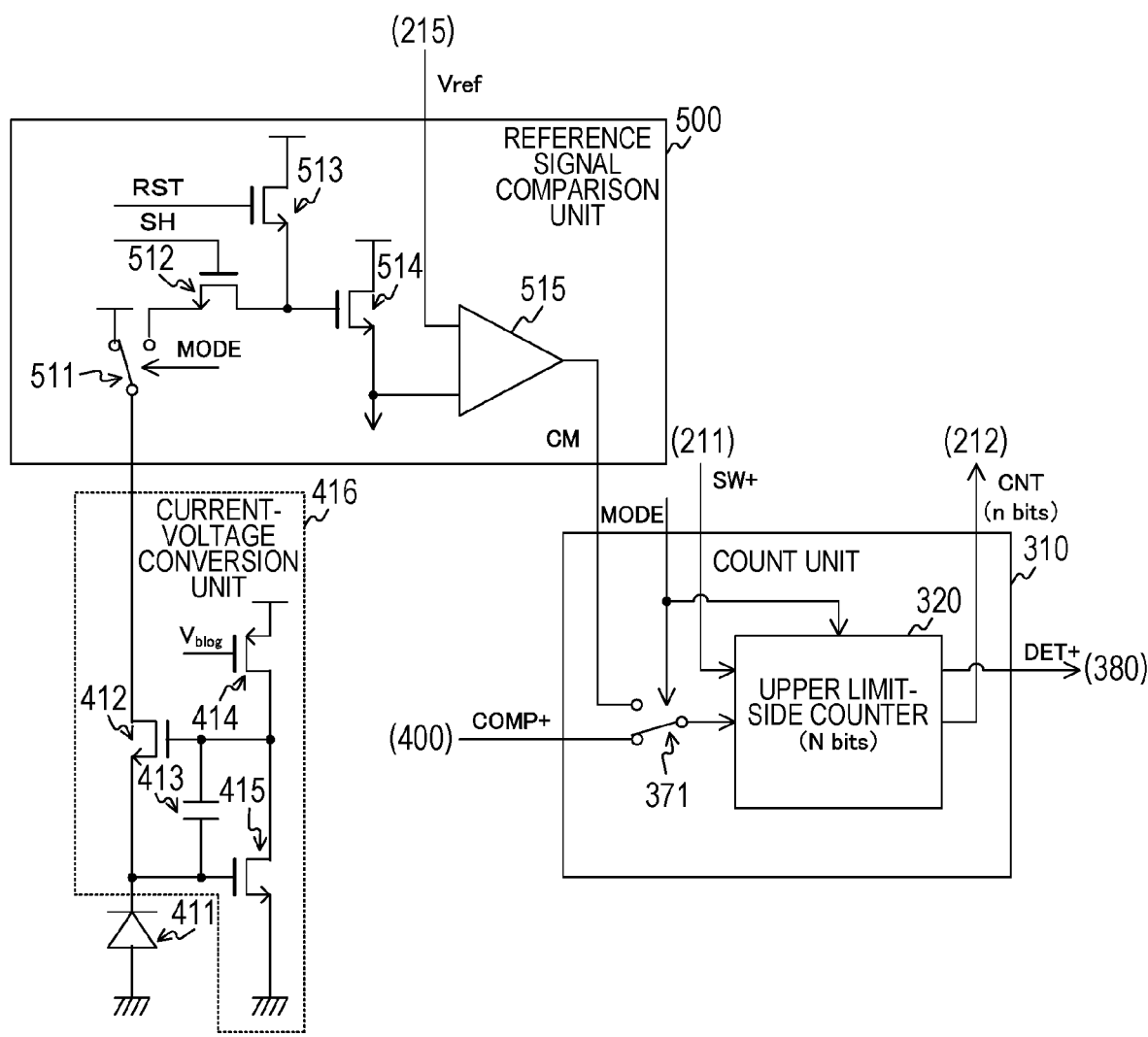
FIG. 27 is a circuit diagram illustrating a configuration example of a reference signal comparison unit according to the third embodiment of the present technology.

FIG. 27 is a circuit diagram illustrating a configuration example of the reference signal comparison unit 500 according to the third embodiment of the present technology. The reference signal comparison unit 500 includes a selector 511, a transfer transistor 512, a reset transistor 513, an amplification transistor 514, and a comparator 515. As the transistors in the reference signal comparison unit 500, for example, N-type MOS transistors are used.

The selector 511 selects either a power supply terminal or the transfer transistor 512 according to the mode signal MODE to connect the selected terminal or transistor to the current-voltage conversion unit 416. This switch 511 connects the transfer transistor 512 to the current-voltage conversion unit 416 in the imaging mode, and connects the power supply terminal to the current-voltage converter 416 in the detection mode.

The transfer transistor 512 transfers a charge from the current-voltage conversion unit 416 to a floating diffusion layer according to a transfer signal SH from the control circuit 211. The reset transistor 513 initializes the floating diffusion layer according to a reset signal RST from the control circuit 211. The amplification transistor 514 amplifies a potential of the floating diffusion layer and supplies the amplified potential to the comparator 515 as a pixel signal. The comparator 515 compares the pixel signal with the reference signal Vref from the DAC 215.

In the imaging mode, the control circuit 211 generates a reset level by the reset signal RST immediately before end of exposure, and transfers the charge by the transfer signal SH at the end of exposure to generate a signal level.

With the above configuration, the count unit 310 is used for both the on-event detection processing and the AD conversion processing for generating pixel data. Therefore, the circuit scale of the solid-state image sensor 200 can be reduced as compared with a configuration having a counter for AD conversion outside the count unit 310.

As described above, according to the third embodiment of the present technology, the count unit 310 counts the count value on the basis of either the comparison result CM with respect to the reference signal or the comparison result COMP+ with respect to the threshold voltage. Therefore, there is no need to add a counter that counts a count value on the basis of the comparison result CM. As a result, the circuit scale of the solid-state image sensor 200 can be reduced as compared with the case of adding the counter.

[First Modification]

In the above-described third embodiment, the count unit 310 outputs the N-bit count value CNT (that is, the pixel data). However, N bits may be insufficient for the data size of the pixel data. Therefore, the count unit 310 according to a first modification of the third embodiment is different from the third embodiment in enlarging the size of the pixel data to eliminate the lack of the data size.

Figure 28:
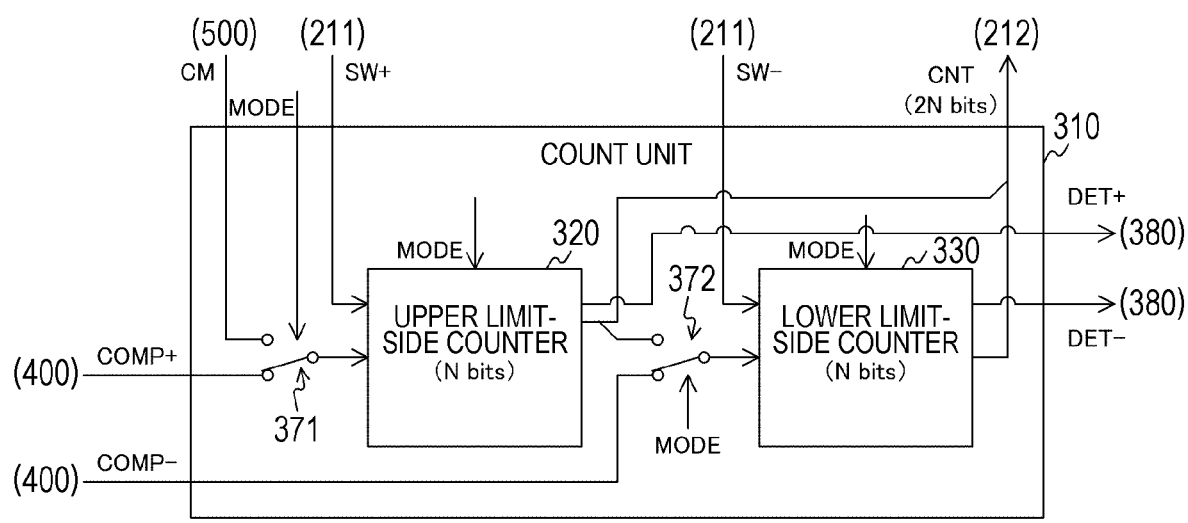
FIG. 28 is a block diagram illustrating a configuration example of a count unit according to a first modification of the third embodiment of the present technology.

FIG. 28 is a block diagram illustrating a configuration example of the count unit 310 according to the first modification of the third embodiment of the present technology. The count unit 310 of the first modification of the third embodiment is different from that of the third embodiment in further including a selector 372 and a lower limit-side counter 330.

Furthermore, in the comparator 440 (not illustrated) according to the first modification of the third embodiment, a P-type transistor 443 and an N-type transistor 444 are further arranged, and the comparator 440 further outputs a comparison result COMP−.

Furthermore, the upper limit-side counter 320 according to the first modification of the third embodiment supplies the N-th digit bit to the selector 372 in the imaging mode. Furthermore, the upper limit-side counter 320 supplies the N bits to the signal processing unit 212 as a bit string of a lower digit of a 2N-bit count value CNT.

Meanwhile, in the detection mode, the upper limit-side counter 320 counts the count value every time the high-level output signal (comparison result COMP+) is output from the selector 371, and outputs the n-th digit to the transfer unit 380 as the detection signal DET+ of an on-event according to the control signal SW+.

The selector 372 outputs either the N-th digit from the upper limit-side counter 320 or the comparison result COMP− to the lower limit-side counter 330 according to the mode signal MODE. Note that the selector 371 is an example of a front-stage selector described in the claims, and the selector 372 is an example of a rear-stage selector described in the claims. The circuit including the selectors 371 and 372 is an example of a selection unit described in the claims.

The lower limit-side counter 330 according to the first modification of the third embodiment counts the N-bit count value every time the high-level output signal (N-th digit) is output from the selector 372 in the imaging mode. Then, the lower limit-side counter 330 supplies the N bits to the signal processing unit 212 as a bit string of an upper digit of the 2N-bit count value CNT.

The 2N-bit count value CNT is generated for each pixel by the N bits from the front-stage upper limit-side counter 320 and the N bits from the rear-stage lower limit-side counter 330. The signal processing unit 212 arranges data indicating the count value CNT for each pixel in a two-dimensional lattice manner as pixel data of the pixel to generate image data. Note that the upper limit-side counter 320 is an example of a front-stage counter described in the claims, and the lower limit-side counter 330 is an example of a rear-stage counter described in the claims.

Meanwhile, in the detection mode, the lower limit-side counter 330 counts the count value every time the low-level output signal (comparison result COMP−) is output from the selector 371, and outputs the n-th digit to the transfer unit 380 as the detection signal DET− of an off-event according to the control signal SW−.

Note that the upper limit-side counter 320 is arranged in the front stage and the lower limit-side counter 330 is arranged in the rear stage. However, the embodiment is not limited to this configuration. Conversely, the upper limit-side counter 320 can be arranged in the rear stage and the lower limit-side counter 330 can be arranged in the front stage.

As described above, according to the first modification of the third embodiment of the present technology, the lower limit-side counter 330 is further arranged in the rear stage of the upper limit-side counter 320. Therefore, the count value having a larger size (2N bits or the like) can be counted than the case of using only the upper limit-side counter 320.

[Second Modification]

In the above-described first modification of the third embodiment, the count unit 310 outputs the 2N-bit count value CNT (that is, the pixel data). However, 2N bits may be insufficient for the data size of the pixel data. Therefore, the count unit 310 according to a second modification of the third embodiment is different from the third embodiment in further enlarging the size of the pixel data to eliminate the lack of the data size.

Figure 29:
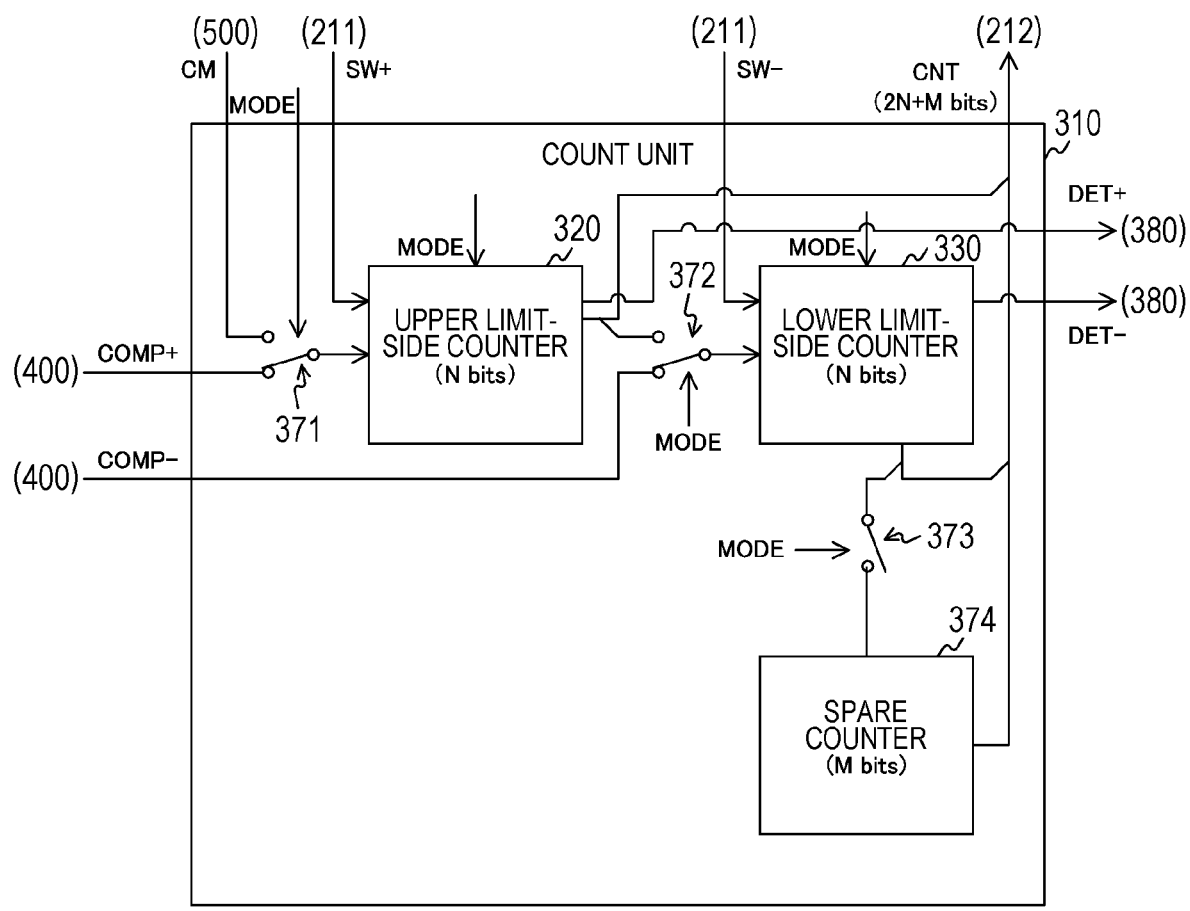
FIG. 29 is a block diagram illustrating a configuration example of a count unit according to a second modification of the third embodiment of the present technology.

FIG. 29 is a block diagram illustrating a configuration example of the count unit 310 according to the second modification of the third embodiment of the present technology. The count unit 310 according to the second modification of the third embodiment is different from the third embodiment in further including a switch 373 and a spare counter 374.

The switch 373 opens and closes a path between a terminal that outputs the N-th digit of the lower limit-side counter 330 and an input terminal of the spare counter 374 according to the mode signal MODE. The switch 373 shifts to a closed state in the imaging mode and shifts to an open state in the detection mode.

The spare counter 374 counts an M-bit (M is an integer) count value every time the high-level output signal (the N-th digit) is output from the switch 373 in the imaging mode. The spare counter 374 supplies the M bits to the signal processing unit 212 as a bit string of an upper digit of the count value CNT. The (2N+M)-bit count value CNT is generated for each pixel by the N bits from the upper limit-side counter 320, the N bits from the lower limit-side counter 330, and the M bits from the spare counter 374.

Figure 30:
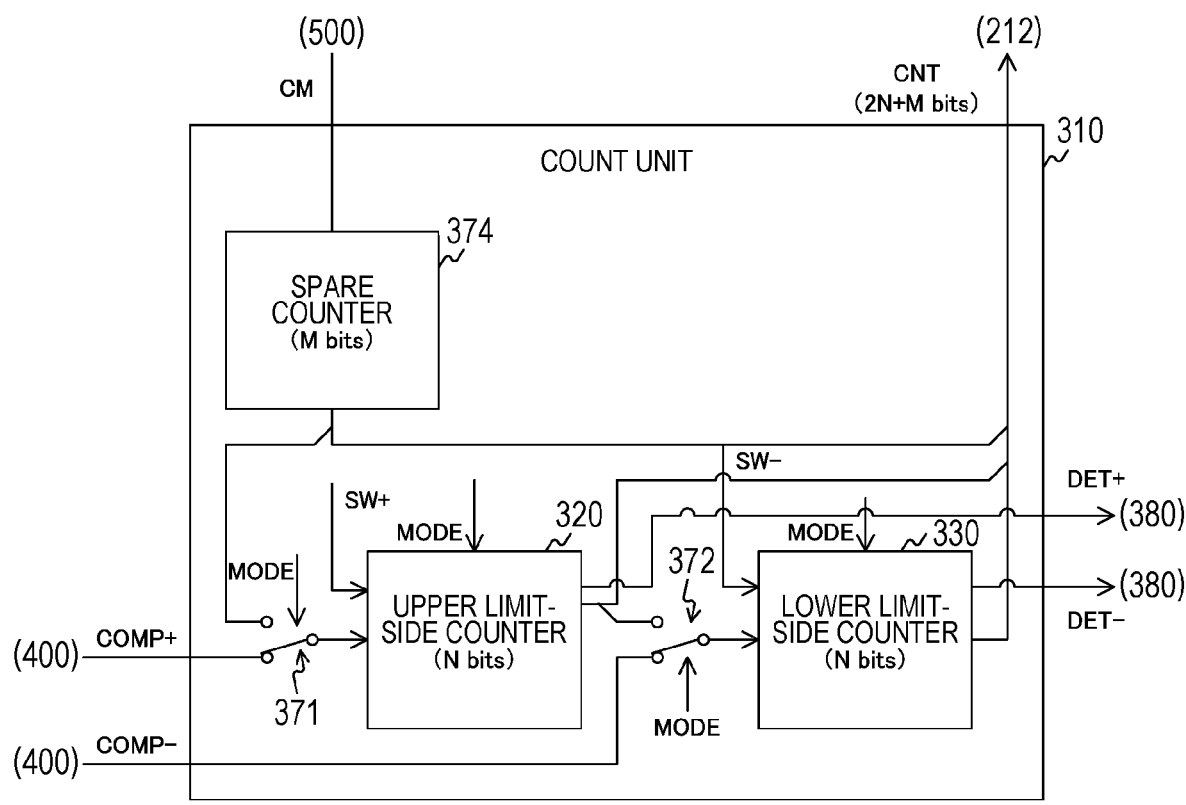
FIG. 30 is a block diagram illustrating a configuration example of the count unit having a spare counter arranged at a front stage according to the second modification of the third embodiment of the present technology.

Note that the spare counter 374 can be arranged in the front stage of the upper limit-side counter 320, as illustrated in FIG. 30. By arranging the spare counter 374 between the selector 371 and the reference signal comparison unit 500, a parasitic capacitance of N-digit LSBs of the upper limit-side counter 320 can be made small, as compared with FIG. 29. Thereby, power consumption can be reduced.

As described above, according to the first modification of the third embodiment of the present technology, the spare counter 374 is further arranged. Therefore, the count value having a larger size ((2N+M) bits or the like) can be counted than the case of using only the upper limit-side counter 320 and the lower limit counter 330.

4. Imaging Device According to Fourth Embodiment (Scan Method)

The above-described imaging device 20 according to the first configuration example is an asynchronous imaging device that reads events by an asynchronous readout method. However, the event readout method is not limited to the asynchronous readout method and may be the synchronous readout method. An imaging device to which the synchronous readout method is applied is a scan-type imaging device, which is the same as a normal imaging device that performs imaging at a predetermined frame rate.

Figure 31:
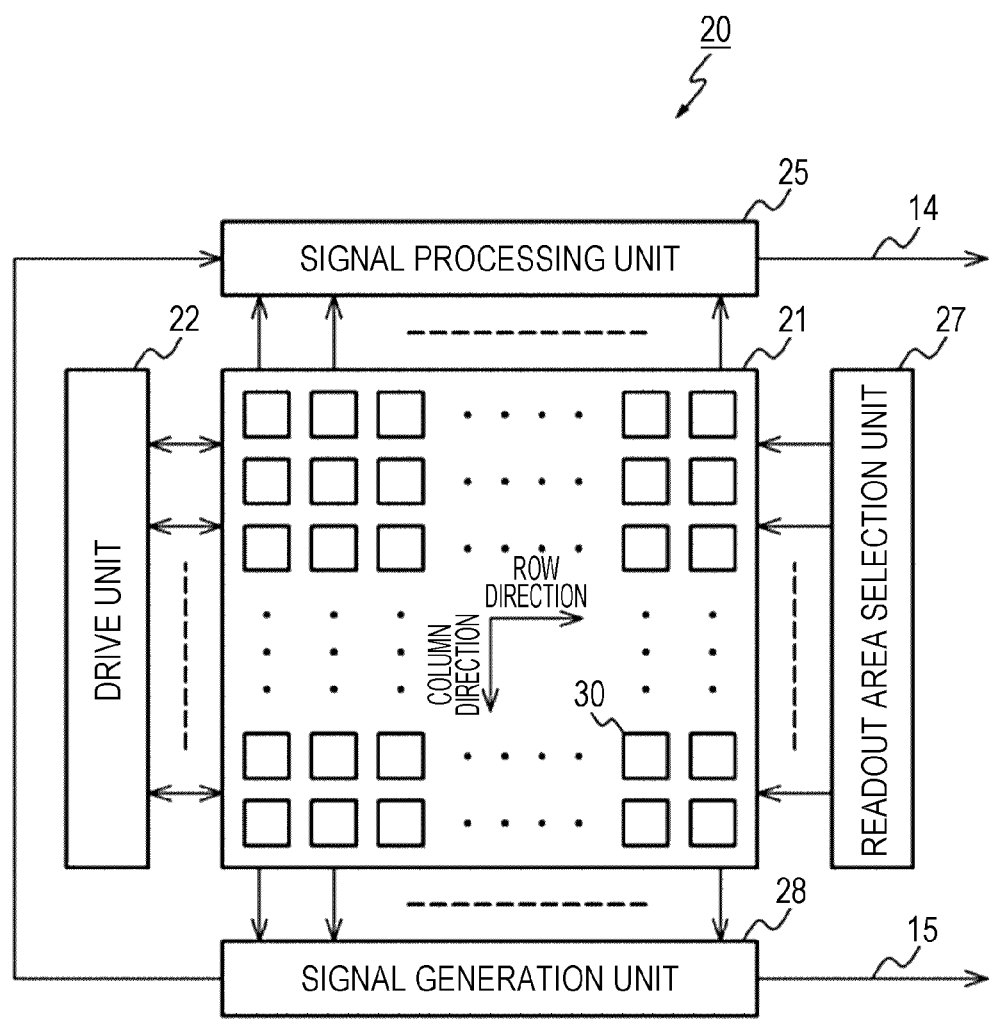
FIG. 31 is a block diagram illustrating a configuration example of an imaging device according to a fourth embodiment of the present technology.

FIG. 31 is a block diagram illustrating an example of a configuration of an imaging device according to a second configuration example, that is, a scan-type imaging device, which is used as an imaging device 20 in an imaging system 10 to which the technology according to the present disclosure is applied.

As illustrated in FIG. 31, the imaging device 20 according to the second configuration example as the imaging device of the present disclosure includes a pixel array unit 21, a drive unit 22, a signal processing unit 25, a readout area selection unit 27, and a signal generation unit 28.

The pixel array unit 21 includes a plurality of pixels 30. The plurality of pixels 30 outputs output signals in response to a selection signal from the readout area selection unit 27. The configuration of each of the plurality of pixels 30 is similar to that of the pixel 300 illustrated in FIG. 4. The plurality of pixels 30 outputs output signals corresponding to the amount of change in light intensity. The plurality of pixels 30 may be two-dimensionally arranged in a matrix as illustrated in FIG. 31.

The drive unit 22 drives each of the plurality of pixels 30 and causes the signal processing unit 25 to output the pixel signal generated in each pixel 30. Note that the drive unit 22 and the signal processing unit 25 are circuit units for acquiring gradation information. Therefore, in a case of acquiring only event information, the drive unit 22 and the signal processing unit 25 may be omitted.

The readout area selection unit 27 selects part of the plurality of pixels 30 included in the pixel array unit 21. Specifically, the readout area selection unit 27 determines a selected area in response to a request from each pixel 30 of the pixel array unit 21. For example, the readout area selection unit 27 selects any one or a plurality of rows from among rows included in a structure of a two-dimensional matrix corresponding to the pixel array unit 21. The readout area selection unit 27 sequentially selects one or a plurality of rows according to a preset cycle. Furthermore, the readout area selection unit 27 may determine the selected area in response to a request from each pixel 30 of the pixel array unit 21.

The signal generation unit 28 generates an event signal corresponding to an active pixel that has detected an event among the selected pixels on the basis of the output signals of the pixels selected by the readout area selection unit 27. The event is an event in which the intensity of light changes. The active pixel is a pixel in which the amount of change in the intensity of light corresponding to the output signal exceeds or falls below a preset threshold. For example, the signal generation unit 28 compares the output signal of the pixel with a reference signal, detects the active pixel that outputs the output signal in a case where the output signal is larger or smaller than the reference signal, and generates the event signal corresponding to the active pixel.

The signal generation unit 28 can include, for example, a column selection circuit that arbitrates signals entering the signal generation unit 28. Furthermore, the signal generation unit 28 may be configured to output not only the information of the active pixel in which an event is detected but also information of inactive pixels in which an event is not detected.

The signal generation unit 28 outputs address information and time stamp information (for example, (X, Y, T)) of the active pixel in which the event is detected through an output line 15. Note that data output from the signal generation unit 28 may be not only the address information and the time stamp information but also frame format information (for example, (0, 0, 1, 0, . . . )).

5. Application Examples to Moving Bodies

The technology according to the present disclosure (present technology) can be applied to various products. For example, the technology according to the present disclosure may be realized as a device mounted on any type of moving bodies including an automobile, an electric automobile, a hybrid electric automobile, a motorcycle, a bicycle, a personal mobility, an airplane, a drone, a ship, a robot, and the like.

Figure 32:
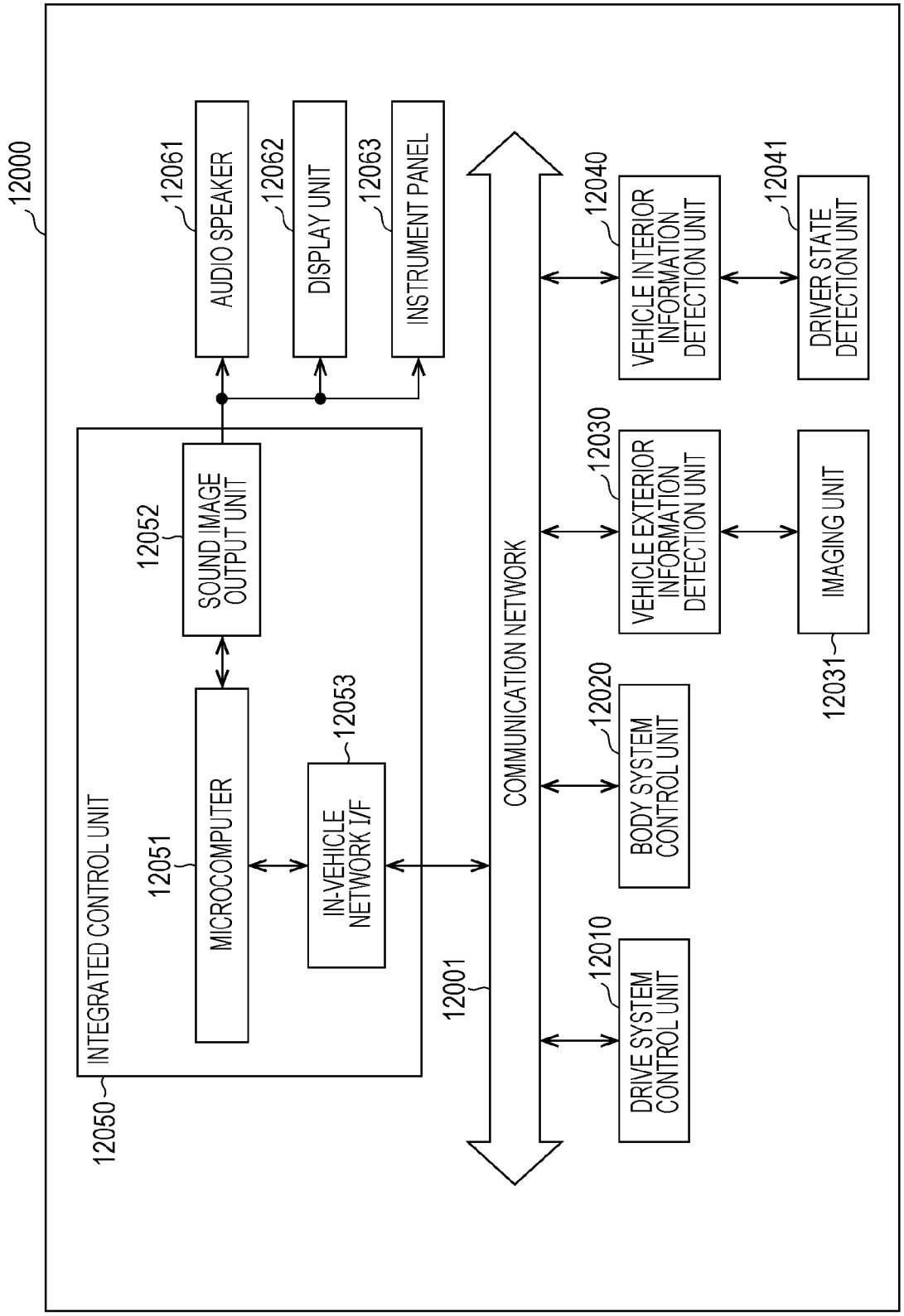
FIG. 32 is a block diagram illustrating a schematic configuration of a vehicle control system.

FIG. 32 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 32, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle, and the like.

The body system control unit 12020 controls operations of various devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters on a road surface, or the like on the basis of the received image.

The imaging unit 12031 is an optical sensor that receives light and outputs an electrical signal according to a light reception amount of the light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive force generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on a vehicular gap, vehicle speed maintaining travel, collision warning of the vehicle, lane out warning of the vehicle, and the like.

Furthermore, the microcomputer 12051 controls the drive force generation device, the steering mechanism, the braking device, or the like on the basis of the information of a vicinity of the vehicle acquired in the vehicle exterior information detection unit 12030 or the vehicle interior information detection unit 12040 to perform cooperative control for the purpose of automatic drive of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare such as by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify a passenger of the vehicle or an outside of the vehicle of information. In the example in FIG. 32, as the output device, an audio speaker 12061, a display unit 12062, and an instrument panel 12063 are exemplarily illustrated. The display unit 12062 may include, for example, at least one of an on-board display or a head-up display.

Figure 33:
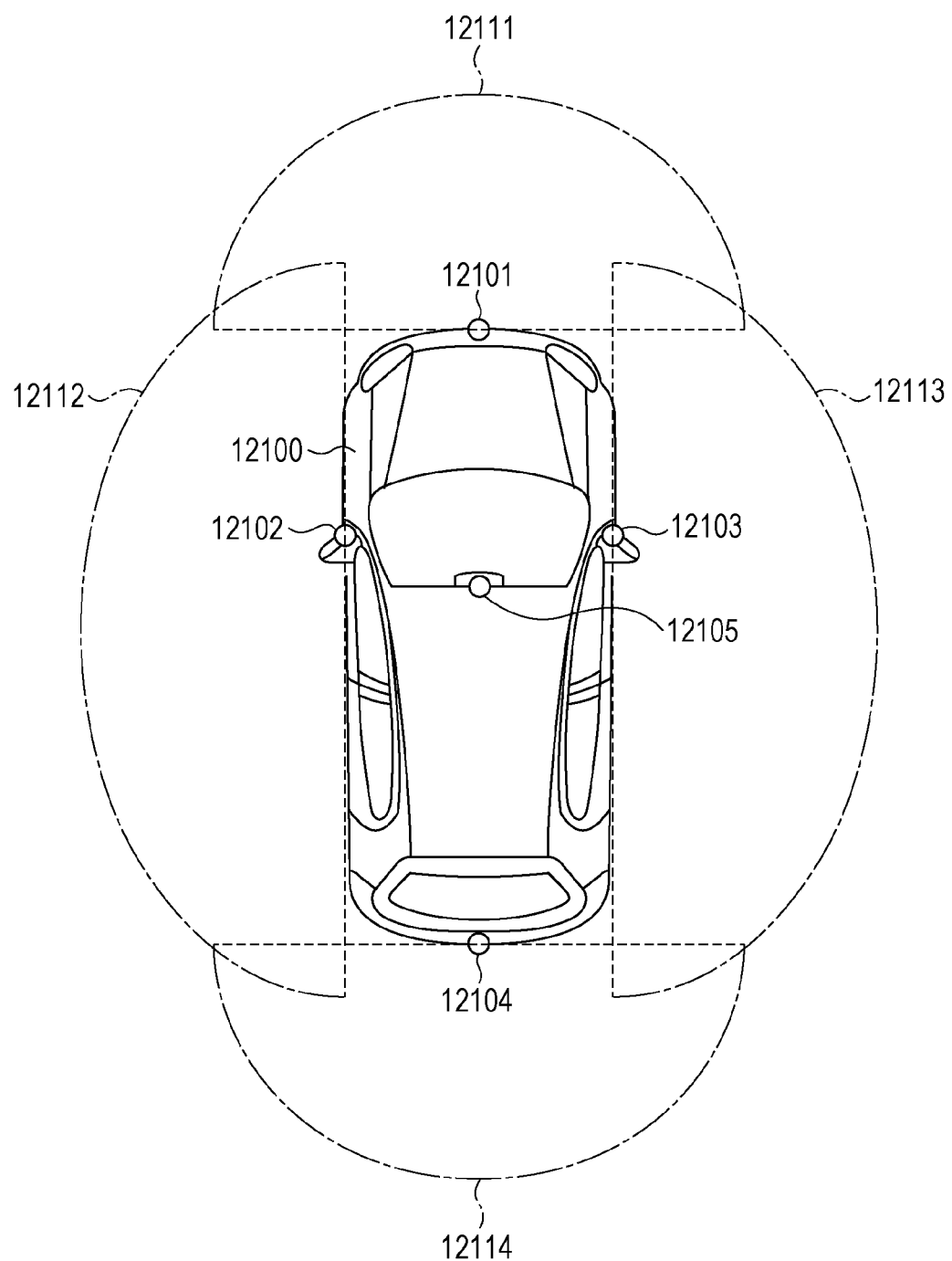
FIG. 33 is an explanatory diagram illustrating an example of an installation position of an imaging unit.

FIG. 33 is a diagram illustrating an example of an installation position of the imaging unit 12031.

In FIG. 33, imaging units 12101, 12102, 12103, 12104, and 12105 are included as the imaging unit 12031.

The imaging units 12101, 12102, 12103, 12104, and 12105 are provided at positions of a front nose, side mirrors, a rear bumper or a back door, an upper portion of a windshield, and the like in an interior of the vehicle 12100, for example. The imaging unit 12101 provided at the front nose and the imaging unit 12105 provided at an upper portion of the windshield in an interior of the vehicle mainly acquire images in front of the vehicle 12100. The imaging units 12102 and 12103 provided at the side mirrors mainly acquire images on sides of the vehicle 12100. The imaging unit 12104 provided at the rear bumper or the back door mainly acquires an image in back of the vehicle 12100. The imaging unit 12105 provided at the upper portion of the windshield in the interior of the vehicle is mainly used for detecting a preceding vehicle, a pedestrian, an obstacle, a traffic signal, a traffic sign, a lane, or the like.

Note that FIG. 33 illustrates an example of capture ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of imaging elements or may be an image sensor having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract particularly a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic driving of autonomous travel without depending on an operation of the driver, and the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. The microcomputer 12051 then determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the captured images of the imaging units 12101 to 12104, thereby to recognize the pedestrian. Such recognition of a pedestrian is performed by a process of extracting characteristic points in the captured images of the imaging units 12101 to 12104, as the infrared camera, for example, and by a process of performing pattern matching processing for the series of characteristic points indicating a contour of an object and determining whether or not the object is a pedestrian. When the microcomputer 12051 determines that a pedestrian exists in the captured images of the imaging units 12101 to 12104 and recognizes the pedestrian, the sound image output unit 12052 causes the display unit 12062 to superimpose and display a square contour line for emphasis on the recognized pedestrian. Furthermore, the sound image output unit 12052 may cause the display unit 12062 to display an icon or the like representing the pedestrian at a desired position.

An example of a vehicle control system to which the technology according to the present disclosure is applicable has been described. The technology according to the present disclosure is applicable to the imaging unit 12031 or the like, of the above-described configurations. Specifically, for example, the imaging device 100 in FIG. 1 can be applied to the imaging unit 12031. By applying the technology according to the present disclosure to the imaging unit 12031, the time required to adjust the threshold can be reduced and the convenience and safety of the system can be improved.

Note that the above-described embodiments describe an example for embodying the present technology, and the matters in the embodiments and the matters used to specify the invention in the claims have correspondence, respectively. Similarly, the matters used to specify the invention in the claims and the matters in the embodiment of the present technology given the same names have correspondence, respectively. However, the present technology is not limited to the embodiments, and can be embodied by application of various modifications to the embodiments without departing from the gist of the present technology.

Furthermore, the processing procedures described in the above embodiments may be regarded as a method having these series of procedures, and also regarded as a program for causing a computer to execute these series of procedures and as a recording medium for storing the program. As this recording medium, for example, a compact disc (CD), a mini disc (MD), a digital versatile disc (DVD), a memory card, a Blu-ray (registered trademark) disc, or the like can be used.

Note that the effects described in the present specification are merely examples and are not limited, and other effects may be exhibited.

Note that the present technology can also have the following configurations.

(1) A solid-state image sensor including:
 a voltage comparison unit configured to compare an analog signal according to an amount of change in incident light with a predetermined voltage indicating a boundary of a predetermined voltage range, and output a comparison result as a voltage comparison result; and
 a count unit configured to count a count value every time the voltage comparison result indicating that the analog signal falls outside the voltage range is output.

(2) The solid-state image sensor according to (1), further including:
 a control circuit configured to supply a predetermined control signal, in which
 the count unit selects any of a plurality of bits indicating the count value and output the selected bit according to the control signal.

(3) The solid-state image sensor according to (2), in which
 the predetermined voltage includes an upper limit voltage indicating an upper limit of the voltage range and a lower limit voltage indicating a lower limit of the voltage range, and
 the count unit includes
 an upper limit-side counter that counts a count value every time the voltage comparison result indicating that the analog signal is higher than the upper limit voltage is output, and
 a lower limit-side counter that counts a count value every time the voltage comparison result indicating that the analog signal is lower than the lower limit voltage is output.

(4) The solid-state image sensor according to (3), in which
 the predetermined voltage is a variable voltage that varies to either the upper limit voltage or the lower limit voltage different from each other, and
 the count unit further includes
 an upper limit-side switch that opens or closes a path between the voltage comparison unit and the upper limit counter according to a polarity signal indicating a value of the variable voltage, and
 a lower limit-side switch that opens or closes a path between the voltage comparison unit and the lower limit counter according to the polarity signal.

(5) The solid-state image sensor according to (1), further including:
 a reference signal comparison unit configured to compare a pixel signal according to a light amount of the incident light with a predetermined reference signal, and output a comparison result as a reference signal comparison result, in which
 the count unit includes
 a selection unit that select either the voltage comparison result or the reference signal comparison result, and
 a counter that counts the count value on the basis of the selected comparison result.

(6) The solid-state image sensor according to (5), in which
 the predetermined voltage includes an upper limit voltage indicating an upper limit of the voltage range and a lower limit voltage indicating a lower limit of the voltage range,
 the voltage comparison result includes an upper limit-side comparison result indicating a comparison result between the analog signal and the upper limit voltage, and a lower limit-side comparison result indicating a comparison result between the analog signal and the lower limit voltage,
 the counter includes a front-stage counter and a rear-stage counter, and
 the selection unit includes
 a front-stage selector that selects either one of the upper limit-side comparison result and the lower limit-side comparison result, or the reference signal comparison result, and supplies the selected comparison result to the front-stage counter, and
 a rear-stage selector that selects the other of the upper limit-side comparison result and the lower limit-side comparison result, or an output bit of the front-stage counter, and supplies the selected result to the rear-stage counter.

(7) The solid-state image sensor according to (6), in which
 the counter further includes a spare counter.

(8) The solid-state image sensor according to (7), in which
 the spare counter counts a count value on the basis of an output bit of the rear-stage counter, and
 a switch that opens or closes a path between the rear-stage selector and the spare counter is further included.

(9) The solid-state image sensor according to (7), in which
 the spare counter is inserted between the front-stage selector and the reference signal comparison unit.

(10) The solid-state image sensor according to (1), further including:
 a control circuit configured to supply a predetermined threshold, in which
 the count unit includes
 a counter that counts the count value every time the voltage comparison result indicating that the analog signal falls outside the voltage range is output, and
 a threshold comparison unit that compares the count value with the threshold.

(11) The solid-state image sensor according to (10), in which
 the predetermined voltage includes an upper limit voltage indicating an upper limit of the voltage range and a lower limit voltage indicating a lower limit of the voltage range, and
 the counter
 performs one of increment processing and decrement processing for the count value in a case where the voltage comparison result indicating that the analog signal is higher than the upper limit voltage is output, and performs the other of the increment processing and the decrement processing in a case where the voltage comparison result indicating that the analog signal is lower than the lower limit voltage is output.

(12) The solid-state image sensor according to (11), in which
the predetermined voltage is a variable voltage that varies to either the upper limit voltage or the lower limit voltage different from each other, and
the counter performs one of the increment processing and the decrement processing on the basis of a polarity signal indicating a value of the variable voltage and the voltage comparison result.

(13) The solid-state image sensor according to any one of (1) to (12), in which
the voltage comparison unit is arranged in each of a plurality of pixels,
the count unit is arranged in a pixel block in which the plurality of pixels is arrayed, and
the count unit includes
a comparison result processing unit that processes the voltage comparison results respectively corresponding to the plurality of pixels, and
a counter that counts the count value on the basis of a processing result of the comparison result processing unit.

(14) The solid-state image sensor according to (13), in which
the predetermined voltage is a variable voltage that varies to either the upper limit voltage or the lower limit voltage different from each other,
the comparison result processing unit includes
an upper limit-side comparison result processing unit that processes the voltage comparison result corresponding to the upper limit voltage, and
a lower limit-side comparison result processing unit that processes the voltage comparison result corresponding to the lower limit voltage, and
the count unit further includes
an upper limit-side switch that opens or closes a path between the voltage comparison unit and the upper limit-side comparison result processing unit according to a polarity signal indicating a value of the variable voltage, and
a lower limit-side switch that opens or closes a path between the voltage comparison unit and the lower limit-side comparison result processing unit according to the polarity signal.

(15) The solid-state image sensor according to (13), in which
the comparison result processing unit outputs an exclusive logical sum of the voltage comparison results respectively corresponding to the plurality of pixels as the processing result.

(16) The solid-state image sensor according to (13), in which
the comparison result processing unit outputs a logical sum of the voltage comparison results respectively corresponding to the plurality of pixels as the processing result.

(17) The solid-state image sensor according to (13), in which
the comparison result processing unit selects any of the voltage comparison results respectively corresponding to the plurality of pixels and outputs the selected voltage comparison result as the processing result.

(18) The solid-state image sensor according to any one of (1) to (17), in which
the voltage comparison unit includes
a current-voltage conversion unit that converts a photocurrent into a voltage signal,
a differentiator circuit that differentiates the voltage signal and outputs the differentiated voltage signal as the analog signal, and
a comparator that compares the analog signal with the predetermined voltage.

(19) The solid-state image sensor according to (18), further including:
an initialization control unit configured to control the differentiator circuit to set the analog signal to a predetermined initial value every time the count value is counted.

(20) The solid-state image sensor according to any one of (1) to (19), further including:
a transfer unit configured to transfer a signal indicating a result of comparison between the count value and a predetermined threshold, and initialize the count value after transferring the signal.

REFERENCE SIGNS LIST

100 Imaging device
110 Imaging lens
120 Recording unit
130 Control unit
200 Solid-state image sensor
201 Light-receiving chip
202 Circuit chip
211 Control circuit
212 Signal processing unit
213 Arbiter
214 Pixel array unit
215 DAC
300 Pixel
301 Pixel block
310 Count unit
311 to 314, 324, 325, 326, 334, 335, 336, 343, and 373 Switch
320 Upper limit-side counter
321 and 331 Zero-th digit output unit
322 and 332 First digit output unit
323 and 333 Second digit output unit
330 Lower limit-side counter
340 Upper limit-side comparison result processing unit
341, 393, and 394 XOR (exclusive logical sum) gate
342 OR (logical sum) gate
350 Lower limit-side comparison result processing unit
361 Up-down counter
362 Upper limit-side comparison circuit
363 Lower limit-side comparison circuit
371, 372, and 511 Selector
374 Spare counter
380 Transfer unit
390 Initialization control unit
391 and 392 Delay unit
400 Voltage comparison unit
410 Logarithmic response unit
411 Photoelectric conversion element
412, 415, 435, 442, and 444 N-type transistor
413, 431, and 434 Capacitor
414, 421, 422, 432, 433, 441, and 443 P-type transistor
416 Current-voltage conversion unit
420 Buffer
430 Differentiator circuit
440 Comparator
500 Reference signal comparison unit
512 Transfer transistor
513 Reset transistor 514 Amplification transistor
515 Comparator
12031 Imaging unit

The invention claimed is:

1. A solid-state image sensor comprising:
a voltage comparison unit configured to compare an analog signal according to an amount of change in incident light with a predetermined voltage indicating a boundary of a predetermined voltage range, and output a comparison result as a voltage comparison result; and
a count unit configured to count a count value every time the voltage comparison result indicating that the analog signal falls outside the voltage range is output.

2. The solid-state image sensor according to claim 1, further comprising:
a control circuit configured to supply a predetermined control signal, wherein
the count unit selects any of a plurality of bits indicating the count value and output the selected bit according to the control signal.

3. The solid-state image sensor according to claim 2, wherein
the predetermined voltage includes an upper limit voltage indicating an upper limit of the voltage range and a lower limit voltage indicating a lower limit of the voltage range, and
the count unit includes
an upper limit-side counter that counts a count value every time the voltage comparison result indicating that the analog signal is higher than the upper limit voltage is output, and
a lower limit-side counter that counts a count value every time the voltage comparison result indicating that the analog signal is lower than the lower limit voltage is output.

4. The solid-state image sensor according to claim 3, wherein
the predetermined voltage is a variable voltage that varies to either the upper limit voltage or the lower limit voltage different from each other, and
the count unit further includes
an upper limit-side switch that opens or closes a path between the voltage comparison unit and the upper limit counter according to a polarity signal indicating a value of the variable voltage, and
a lower limit-side switch that opens or closes a path between the voltage comparison unit and the lower limit counter according to the polarity signal.

5. The solid-state image sensor according to claim 1, further comprising:
a reference signal comparison unit configured to compare a pixel signal according to a light amount of the incident light with a predetermined reference signal, and output a comparison result as a reference signal comparison result, wherein
the count unit includes
a selection unit that select either the voltage comparison result or the reference signal comparison result, and
a counter that counts the count value on a basis of the selected comparison result.

6. The solid-state image sensor according to claim 5, wherein
the predetermined voltage includes an upper limit voltage indicating an upper limit of the voltage range and a lower limit voltage indicating a lower limit of the voltage range,
the voltage comparison result includes an upper limit-side comparison result indicating a comparison result between the analog signal and the upper limit voltage, and a lower limit-side comparison result indicating a comparison result between the analog signal and the lower limit voltage,
the counter includes a front-stage counter and a rear-stage counter, and
the selection unit includes
a front-stage selector that selects either one of the upper limit-side comparison result and the lower limit-side comparison result, or the reference signal comparison result, and supplies the selected comparison result to the front-stage counter, and
a rear-stage selector that selects the other of the upper limit-side comparison result and the lower limit-side comparison result, or an output bit of the front-stage counter, and supplies the selected result to the rear-stage counter.

7. The solid-state image sensor according to claim 6, wherein
the counter further includes a spare counter.

8. The solid-state image sensor according to claim 7, wherein
the spare counter counts a count value on a basis of an output bit of the rear-stage counter, and
a switch that opens or closes a path between the rear-stage selector and the spare counter is further included.

9. The solid-state image sensor according to claim 7, wherein
the spare counter is inserted between the front-stage selector and the reference signal comparison unit.

10. The solid-state image sensor according to claim 1, further comprising:
a control circuit configured to supply a predetermined threshold, wherein
the count unit includes
a counter that counts the count value every time the voltage comparison result indicating that the analog signal falls outside the voltage range is output, and
a threshold comparison unit that compares the count value with the threshold.

11. The solid-state image sensor according to claim 10, wherein
the predetermined voltage includes an upper limit voltage indicating an upper limit of the voltage range and a lower limit voltage indicating a lower limit of the voltage range, and
the counter
performs one of increment processing and decrement processing for the count value in a case where the voltage comparison result indicating that the analog signal is higher than the upper limit voltage is output, and performs the other of the increment processing and the decrement processing in a case where the voltage comparison result indicating that the analog signal is lower than the lower limit voltage is output.

12. The solid-state image sensor according to claim 11, wherein
the predetermined voltage is a variable voltage that varies to either the upper limit voltage or the lower limit voltage different from each other, and
the counter performs one of the increment processing and the decrement processing on a basis of a polarity signal indicating a value of the variable voltage and the voltage comparison result.

13. The solid-state image sensor according to claim 1, wherein
    the voltage comparison unit is arranged in each of a plurality of pixels,
    the count unit is arranged in a pixel block in which the plurality of pixels is arrayed, and
    the count unit includes
    a comparison result processing unit that processes the voltage comparison results respectively corresponding to the plurality of pixels, and
    a counter that counts the count value on a basis of a processing result of the comparison result processing unit.

14. The solid-state image sensor according to claim 13, wherein
    the predetermined voltage is a variable voltage that varies to either the upper limit voltage or the lower limit voltage different from each other,
    the comparison result processing unit includes
    an upper limit-side comparison result processing unit that processes the voltage comparison result corresponding to the upper limit voltage, and
    a lower limit-side comparison result processing unit that processes the voltage comparison result corresponding to the lower limit voltage, and
    the count unit further includes
    an upper limit-side switch that opens or closes a path between the voltage comparison unit and the upper limit-side comparison result processing unit according to a polarity signal indicating a value of the variable voltage, and
    a lower limit-side switch that opens or closes a path between the voltage comparison unit and the lower limit-side comparison result processing unit according to the polarity signal.

15. The solid-state image sensor according to claim 13, wherein
    the comparison result processing unit outputs an exclusive logical sum of the voltage comparison results respectively corresponding to the plurality of pixels as the processing result.

16. The solid-state image sensor according to claim 13, wherein
    the comparison result processing unit outputs a logical sum of the voltage comparison results respectively corresponding to the plurality of pixels as the processing result.

17. The solid-state image sensor according to claim 13, wherein
    the comparison result processing unit selects any of the voltage comparison results respectively corresponding to the plurality of pixels and outputs the selected voltage comparison result as the processing result.

18. The solid-state image sensor according to claim 1, wherein
    the voltage comparison unit includes
    a current-voltage conversion unit that converts a photocurrent into a voltage signal,
    a differentiator circuit that differentiates the voltage signal and outputs the differentiated voltage signal as the analog signal, and
    a comparator that compares the analog signal with the predetermined voltage.

19. The solid-state image sensor according to claim 18, further comprising:
    an initialization control unit configured to control the differentiator circuit to set the analog signal to a predetermined initial value every time the count value is counted.

20. The solid-state image sensor according to claim 1, further comparing:
    a transfer unit configured to transfer a signal indicating a result of comparison between the count value and a predetermined threshold, and initialize the count value after transferring the signal.

* * * * *